United States Patent
Bhattacharya et al.

(10) Patent No.: US 11,824,461 B2
(45) Date of Patent: Nov. 21, 2023

(54) MMC SUBMODULES SCALE-UP METHODOLOGY FOR MV AND HV POWER CONVERSION SYSTEM APPLICATIONS

(71) Applicant: North Carolina State University, Raleigh, NC (US)

(72) Inventors: Subhashish Bhattacharya, Raleigh, NC (US); Mohammed Alharbi, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 17/357,248

(22) Filed: Jun. 24, 2021

(65) Prior Publication Data
US 2021/0408937 A1    Dec. 30, 2021

Related U.S. Application Data

(60) Provisional application No. 63/043,308, filed on Jun. 24, 2020.

(51) Int. Cl.
| | |
|---|---|
| *H02M 7/483* | (2007.01) |
| *H02M 7/537* | (2006.01) |
| *H02M 1/00* | (2006.01) |
| *H02M 1/32* | (2007.01) |
| *H02M 1/14* | (2006.01) |

(52) U.S. Cl.
CPC ....... *H02M 7/4835* (2021.05); *H02M 7/4833* (2021.05); *H02M 1/0067* (2021.05); *H02M 1/143* (2013.01); *H02M 1/325* (2021.05); *H02M 7/537* (2013.01)

(58) Field of Classification Search
CPC .. H02M 7/4835; H02M 7/4833; H02M 7/537; H02M 1/0067; H02M 1/143; H02M 1/325

See application file for complete search history.

(56) References Cited

FOREIGN PATENT DOCUMENTS

WO    WO-2018050256 A1 *  3/2018  ............ H02M 7/483

OTHER PUBLICATIONS

Alharbi et al., Scale-up Methodology of a Modular Multilevel Converter for HVDC Applications,Mar. 2018,IEEE,APEC2018,2379-2386 (Year: 2018).*
Alharbi, et al., "Scale-Up Methodology of a Modular Multilevel Converter for HVdc Applications", IEEE Transactions on Industry Applications, vol. 55, No. 5, Sep./Oct. 2019.

* cited by examiner

*Primary Examiner* — Jue Zhang
(74) *Attorney, Agent, or Firm* — Thomas | Horstemeyer, LLP

(57) ABSTRACT

Various examples are provided related to modular multilevel converter (MMC) scale-up control methodologies which can be applied for MV and HV DC applications. In one example, an MMC includes first and second legs each with submodule (SM) groups connected in series, where each SM group includes a plurality of SMs; local group controllers that can control a corresponding SM group; and a central controller that can control output voltage of the MMC via the local group controllers. The local group controllers can provide capacitor voltage balancing (CVB) control of corresponding SM groups.

11 Claims, 22 Drawing Sheets

|  | $N = 400$ | $N = 40$ | $N = 20$ |
|---|---|---|---|
| LUTs | 128144 | 58645 | 56470 |
|  | 42.21% | 19.32% | 18.6% |
| FFs | 202439 | 156554 | 154156 |
|  | 33.34% | 25.78% | 25.39% |

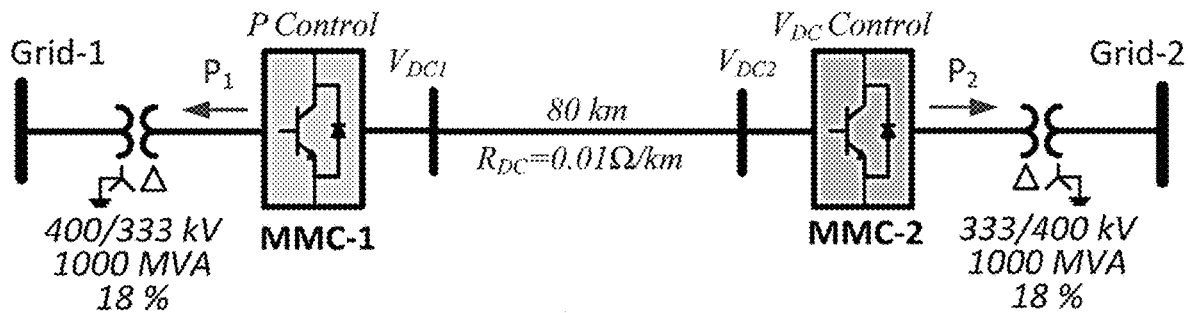

FIG. 9A

PTP MMC-HVDC CIRCUIT PARAMETERS

| Parameter descriptions | Value | Unit |
|---|---|---|
| Rated power | 1000 | MVA |
| Rated DC voltage | 640 | kV |
| AC grid voltage | 400 | kV |
| Rated frequency | 60 | Hz |
| Transformer ratio ($Y_g$ - $\Delta$) | 400/333 | kV |
| Number of SMs per arm | 400 | - |
| SM Capacitance | 15 | mF |
| SM capacitor voltage | 1.6 | kV |
| Arm inductance | 50 | mH |

FIG. 9B

MMC SCALE-UP CONTROL DESIGNS

| Numbers | MMC-1 | MMC-2 |
|---|---|---|
| Number of SMs per set ($N$) | 20 | 40 |
| Number of sets per arm ($n$) | 20 | 10 |
| Total number of SMs per arm ($N_t$) | 400 | 400 |

FIG. 9C

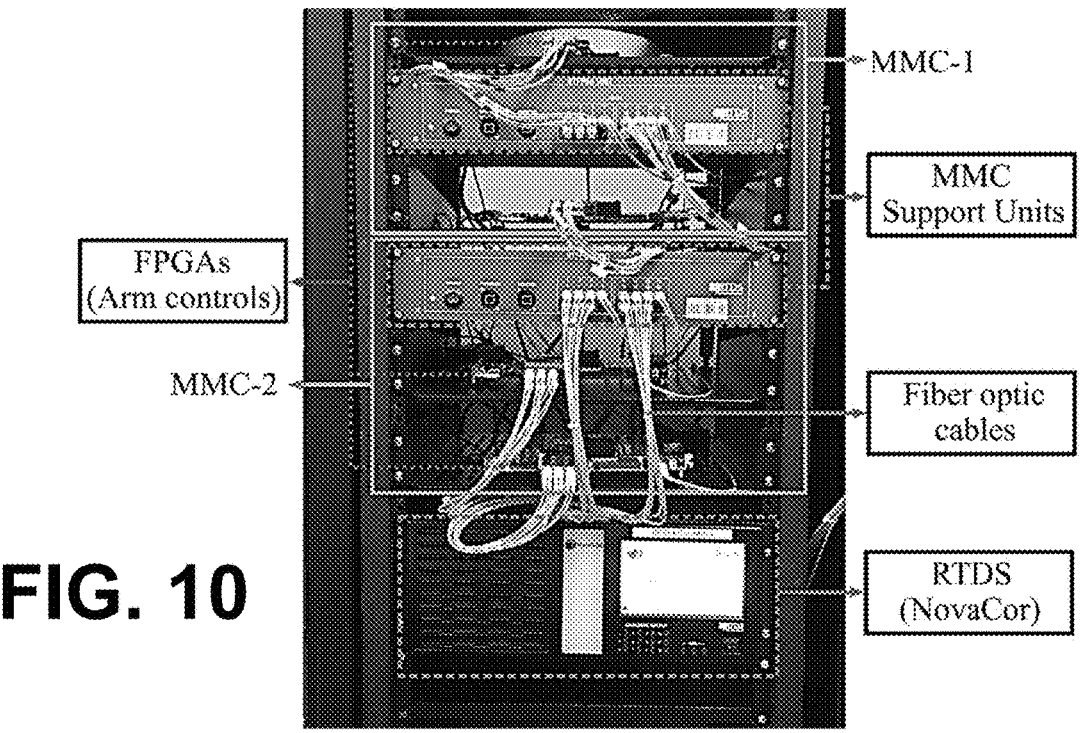
FIG. 10
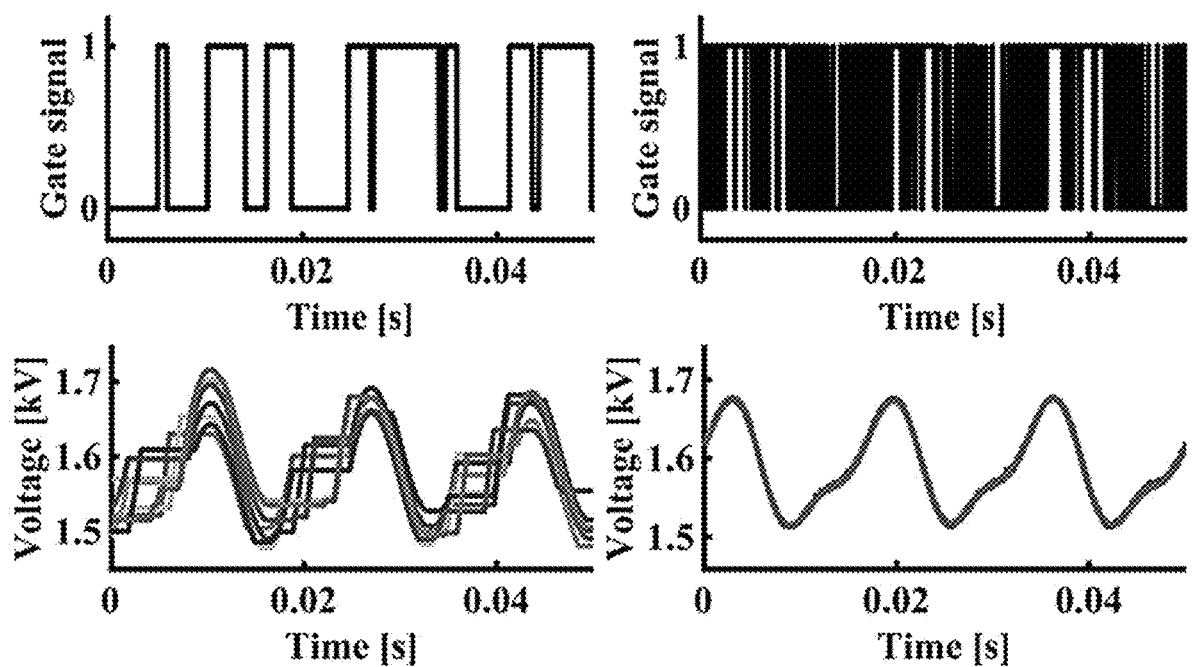
FIG. 11A  FIG. 11B

SWITCHING FREQUENCIES OF MMC-1 WITH DIFFERENT $\beta$ VALUE SETTING

| $\beta$ (kV) | 0.1 | 0.05 | 0.032 | 0.01 | 0.001 |
|---|---|---|---|---|---|
| $f_c$ (Hz) | 180 | 300 | 540 | 1140 | 4500 |

MMC CIRCUIT PARAMETERS

| Symbol | Description | Value | Unit |
|---|---|---|---|
| $S$ | Base MVA | 1000 | MVA |
| $V_{DC}$ | DC voltage | ±320 | kV |
| $v_{abc}$ | Line-to-line AC grid voltage | 400 | kV |
| $T$ | Transformer ($Y_g$ - $\Delta$) | 400/333 | kV |
| $N$ | Number of basic SMs per set | 16 | - |
| $N_R$ | Number of redundant SMs per set | 4 | - |
| $N_{set}$ | Number of SMs per set | 20 | - |
| $n$ | Number of sets per arm | 8 | - |
| $N_{set} \times n$ | Total number of SMs per arm | 20×8=160 | - |
| $v_c^x$ | SM capacitor voltage rating | 5 | kV |
| $L_a$ | Arm inductance | 50 | mH |
| $C$ | SM capacitance | 6 | mF |

FIG. 21B

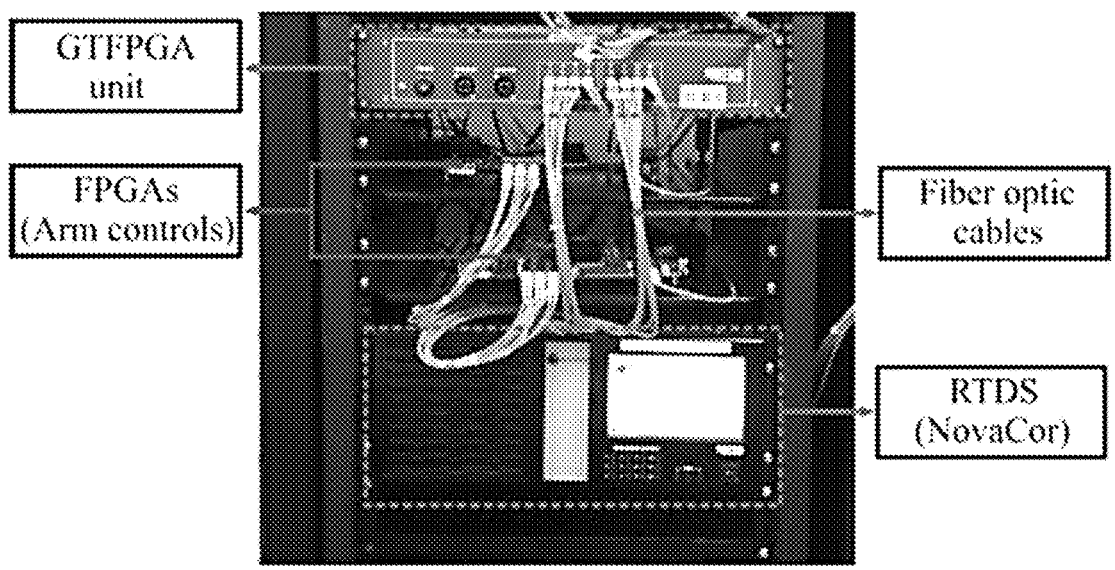

FIG. 22

MMC SUBMODULES SCALE-UP METHODOLOGY FOR MV AND HV POWER CONVERSION SYSTEM APPLICATIONS

CROSS REFERENCE TO RELATED APPLICATIONS

This application claims priority to, and the benefit of, U.S. provisional application entitled "MMC SUBMODULES SCALE-UP METHODOLOGY FOR MV AND HV POWER CONVERSION SYSTEM APPLICATIONS" having Ser. No. 63/043,308, filed Jun. 24, 2020, which is hereby incorporated by reference in its entirety.

BACKGROUND

Modular multilevel converters (MMCs) are a realistic alternative to the conventional voltage source converters for medium-voltage (MV) and high-voltage (HV) direct current (DC) applications. The number of submodules (SMs) per arm of the MMC can be as high as 512 to achieve desired high DC voltage levels required for HVDC with a very low total harmonic distortion (THD) (e.g., <0.1%) of the MMC ac-side interface voltage. Although the low THD of the MMC output voltage with a high number of SMs is desirable, the MMC control implementation and complexity are also important to be considered for the high number of SMs. The MMC control complexity significantly increases as the number of SMs increases. Redesigning the number of SMs in MMCs also becomes quite difficult and may require significant control upgrade, which in turn also needs additional tests and validations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 9A-9C illustrate examples of a PTP MMC-HVdc system implemented in RTDS for verification, in accordance with various embodiments of the present disclosure.

FIG. 10 is an image of the RTDS and MMC support unit hardware, in accordance with various embodiments of the present disclosure.

FIGS. 11A-11C illustrate examples of gate signals of an SM and capacitor voltages of an MMC, in accordance with various embodiments of the present disclosure.

FIGS. 12A and 12B illustrate examples of RTDS evaluation results at steady state of an MMC, in accordance with various embodiments of the present disclosure.

FIGS. 21A and 21B illustrate an example of an MMC-HVDC system simulated in the RTDS system, in accordance with various embodiments of the present disclosure.

FIG. 22 is an image of the RTDS and MMC support unit hardware, in accordance with various embodiments of the present disclosure.

DETAILED DESCRIPTION

Figure 1:
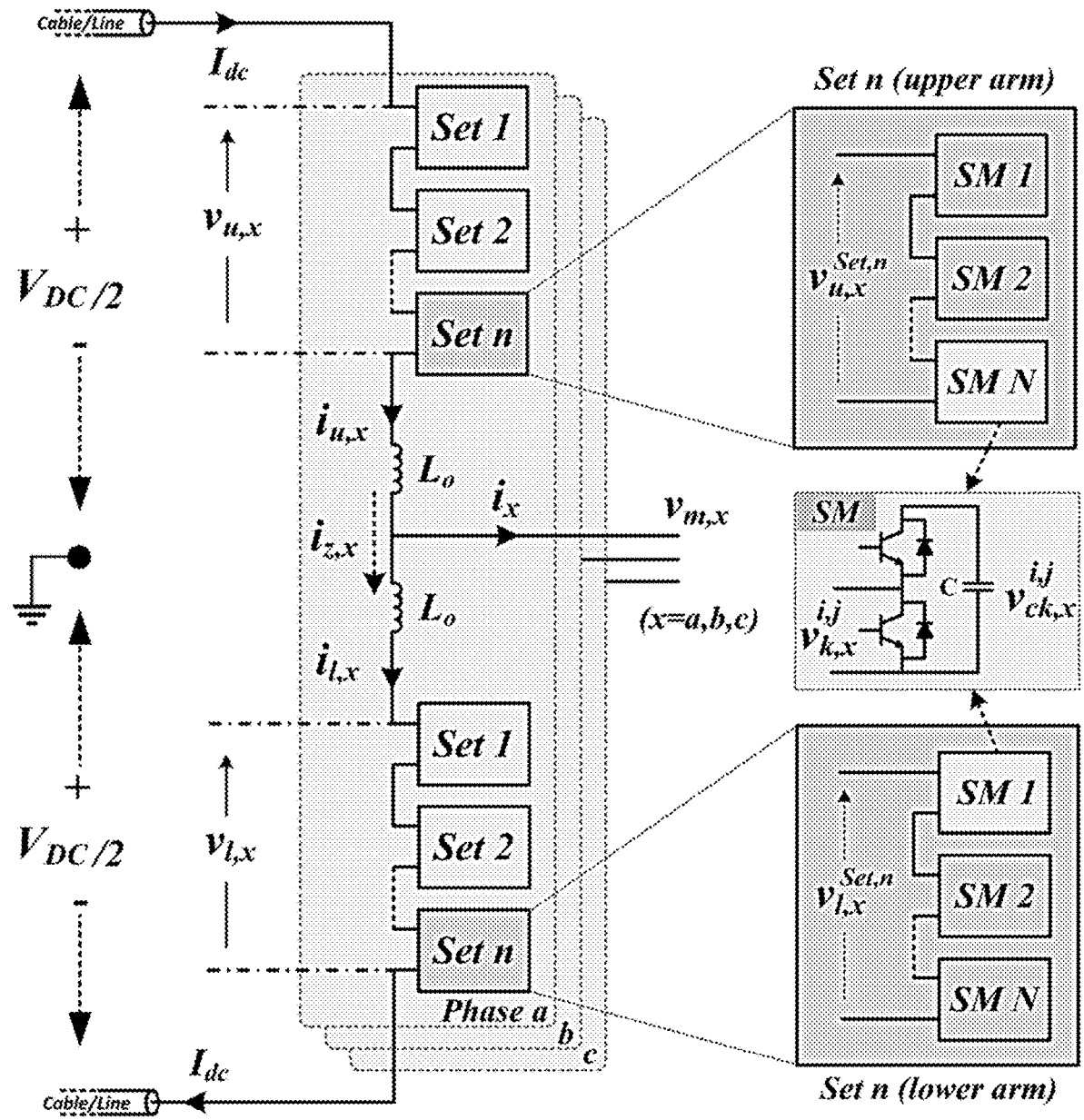
FIG. 1 illustrates an example of a modular multilevel converter (MMC) structure, in accordance with various embodiments of the present disclosure.

The modular multilevel converter (MMC) has drawn remarkable attention for medium and high power applications due to its exceptional features such as scalable and modular structure, the low voltage stress on semiconductor switches, and excellent harmonic performance. MMC technologies are an outstanding competitor and an alternative candidate technology when compared to other transmission technologies for medium-voltage (MV) and high-voltage direct current (HVdc) applications, such as the line-commutated converters and voltage source converters based on two-level and three-level converters. The MMC-HVdc system retains many features such as low switching loss, high efficiency, excellent harmonic (extremely low total harmonic distortion (THD) of MMC ac output voltage) performance, and scalability. However, the circulating currents, dc fault, capacitor voltage balancing (CVB), and control implementation of a high number of submodules (SMs) are the main technical challenges of the MMC-HVdc system.

The MMC circuit utilizes a series-connected large number of submodules (SMs) in a phase leg to achieve the required voltage level for HV and high-power applications. A large number of SMs in the MMC arm (e.g., 512 SMs) are typically needed for medium voltage (MV) and high voltage (HV) DC applications. The complexity of the MMC control system increases with the number of SMs, which eventually limits the MMC system expandability. Typically, the MMC control is difficult to implement with a high number of SMs for high-power applications. In such applications, the probability of an SM failure exists, which may eventually, in the long-term, reduce the availability and reliability of the MMC system, even with redundant SMs. Malfunctioning of multiple SMs in an MMC application results in a higher THD at the output voltage and current, and even system interruption, due to voltage mismatch between upper and lower arms and increased circulating currents This disclosure presents MMC scale-up control methodologies applicable for the MV and HV DC applications. The number of SMs can be conveniently increased or reduced without any significant control modifications. The disclosed control method and capacitor voltage balancing algorithm were implemented in a real-time digital simulator and MMC support units based on field-programmable gate array boards for verification. The performance of the disclosed MMC control method was investigated for a point-to-point MMC-based HVDC system under various operating conditions. Reference will now be made in detail to the description of the embodiments as illustrated in the drawings, wherein like reference numbers indicate like parts throughout the several views.

The MMC-based MV or HVdc applications comprise a high number of SMs with floating capacitors. These capacitors have a significant impact on the MMC output quality. Each SM has a distinct switching state sent from the central control system. Therefore, the CVB control is important to ensure safe and stable operations of MMCs. The CVB control method can be affected by the selection of the modulation techniques such as the nearest level modulation (NLM), selective harmonic elimination (SHE), pulse-width modulation (PWM), and space vector modulation. The phase-disposition and phase-shifted PWM are well-known techniques having exceptional control ability. However, the conventional PWM techniques need a carrier signal for each SM, which is quite difficult and complicated to be implemented with a high number of SMs. The switching frequency of the NLM and SHE techniques, which are staircase modulations, can be as low as the fundamental frequency. The SHE modulation technique requires high computational effort with a large number of SMs. The NLM technique is more appropriate and practical for a high number of SMs because of its implementation simplicity.

Mainly, the quality of the MMC output waveforms depends on the number of SMs. As the number of stepped voltage waveforms increases, the MMC output waveform quality improves. The MMC system can be developed to achieve the desired voltage levels with a very low THD (e.g., <0.1%) of the MMC ac-side interface voltage. The THD of an MMC output voltage for two cases (e.g., $N_t$=40 and $N_t$=512), where $N_t$ is the total number of SMs per arm, is below 1%. According to the IEEE Standard 519, voltage distortions of HVdc systems can have up to 2% THD. Therefore, increasing the number of stepped voltage waveforms after a specific number of SMs at the expense of control complexity is unnecessary when the THD of the MMC output voltage is already relatively low (e.g., <2%).

The MMC system has been widely discussed from different aspects such as voltage and current controls, modulation techniques, SM capacitor voltage balancing controls, and circulating current controls. In the case of a high number of SMs, the MMC control system is very complicated and challenging to validate due to the high computational load and robust data processing requirements. MMC control methods have been proposed for high numbers of SMs, however most of the MMC control systems are discussed and implemented on central control units. In the case of a high number of SMs for HV and high-power applications, the central control structure of the MMC is very challenging. It utilizes high bandwidth for data transmission and a large CPU capability for data processing. The capacity of the central controller depends on the digital signal processor (DSP) and the field-programmable gate array (FPGA) capabilities. The execution completion stays in an acceptable time range for each control cycle. Otherwise, undesired overrun is inevitable in the main controller. Thus, the central control structure reduces the expandability of the MMC system for high voltages and high-power applications.

Distributed control structures have been investigated and applied for MMC based HVDC applications to alleviate the above-mentioned problems of centralized controllers. A distributed control structure was proposed to reduce the communication burden and improve the modularity and expandability of the MMC system with a large number of SMs. However, if the number of SMs is changed, the entire control system requires significant control changes, which is quite difficult because of the additional testing and validation requirements. Decentralized control strategies have also been proposed for MMC systems with a large number of SMs. The capacitor voltage balancing control is divided among local controllers to reduce the communication and computation burdens of controllers. However, a central (external) voltage balancing controller, which is needed for the coordination between local controllers, can be very complicated if there are many such local controllers. Besides, significant modifications to the control system are needed if the number of SMs is changed.

MMC submodules scale-up control structure for medium and high voltage applications is proposed. The voltage balancing control is divided among local controllers to reduce the controllers' communication and computation burdens without the need for a central (external) controller. The number of SMs can easily be extended without significant control changes. However, under SM failures local controllers can be insufficient to balance the SM voltages among sets when the MMC sets operate with unequal numbers of SMs.

In the present disclosure, an MMC scale-up control methodology for MV and HVdc applications is presented. The behavior of a large number of SMs can be predicted by a cumulative set of a smaller number of SMs to reduce the MMC control complexity. In this control method, a fixed number of stepped output voltage waveforms of an MMC can be maintained while the number of SMs is increased to satisfy the voltage level requirements. The modularity and expandability of the MMC scale-up control design are significantly enhanced compared to the existing control methods. The number of SMs and control design can be suitably changed to satisfy different voltage levels. Furthermore, adding or removing SMs from the MMC system can be conveniently performed without any significant modifications in the control architecture.

This control method is valid with most modulation techniques such as PWM and NLM. It is worth pointing out that the number of carrier signals can be significantly reduced when using the conventional PWM techniques; thus, PWM techniques are feasible for high-power applications. Furthermore, there is no need for updating the carrier signals when the number of SMs changes. The NLM and sorting algorithm-based CVB control are adopted for the proposed control design for high-power applications. A sorting algorithm-based CVB control is presented in which sorting a massive number of SMs is efficiently accomplished with less computational burden. The control design and CVB algorithm were verified in a real-time digital simulator (RTDS) and MMC support units based on FPGA boards for a point-to-point (PTP) MMC-HVdc configuration. RTDS results demonstrate that the proposed control method and CVB algorithm provide a satisfactory performance under various operating conditions.

In addition, a novel control method for the MMC based medium and high voltage applications is disclosed to maintain the same output voltage of the upper and lower arms under SM failures. The hot redundancy method with load-sharing effect is applied in this disclosure. The large number of SMs per arm can be divided into sets with a smaller number of SMs. The faulty SMs can be replaced with a relatively minor adjustment to SM capacitor voltages of faulty sets without changing all SM capacitor voltages in the faulty arm. An SM fault-tolerant control method and a capacitor voltage balancing (CVB) control method is presented for operation with unequal numbers of SMs among sets. The communication and computational loads are significantly decreased with the disclosed methodology. Also, the number of SMs can easily be redesigned without major control modifications. Thus, the expandability of the MMC system is significantly enhanced with the proposed control method.

Structure and Operating Principles of MMC

Referring to FIG. 1, shown is an example of the basic structure of an MMC in a HVdc configuration. Each MMC phase comprises upper and lower arms. Each arm contains n sets or groups of SMs and a series-connected inductor $L_o$ to reduce the circulating current amplitude and limit the rising rate of fault currents. Each set then comprises N half-bridge SMs cascaded in series. Each SM can utilize two insulated-gate bipolar transistor switches with an antiparallel diode and a capacitor. The total number of SMs per MMC arm $N_t$ and the capacitor voltage of each SM are, respectively, defined as:

$$N_t = N \times n \quad (1)$$

$$v_{ck,x}^{i,j} = \frac{V_{dc}}{N_t} \begin{cases} i = 1, 2, \ldots, n \\ j = 1, 2, \ldots, N \end{cases} \begin{cases} k = u, l \\ x = a, b, c \end{cases} \quad (2)$$

where N is the number of SMs per set, n is the number of sets per MMC arm, $V_{dc}$ is the dc bus voltage, the subscripts u and l denote the upper and lower arms, respectively, and the subscript x indicates the MMC phase number.

The MMC arms can generate an ac output voltage between 0 and the dc bus voltage $V_{dc}$, which eventually regulate the transmitted energy between the ac and dc sides. The MMC upper and lower arm dynamics can be obtained by applying Kirchhoff's voltage law to the MMC arms as $$v_{u,x} = \frac{V_{dc}}{2} - L_o \frac{di_{u,x}}{dt} - R_o \, i_{u,x} - v_{m,x} \quad (3)$$

$$v_{l,x} = \frac{V_{dc}}{2} - L_o \frac{di_{l,x}}{dt} - R_o \, i_{l,x} + v_{m,x} \quad (4)$$

where $v_{u,x}$ and $v_{l,x}$ are the upper and lower arm voltages, respectively, $i_{u,x}$ and $i_{l,x}$ represent the upper and lower arm currents, respectively, $v_{m,x}$ is the MMC ac-side output voltage, and $L_o$ and $R_o$ are the arm inductance and resistance, respectively.

Ideally, the ac-side output voltage of the MMC $v_{m,x}$ can be represented as a sinusoidal waveform as follows:

$$v_{m,x} = m \frac{V_{dc}}{2} \sin(\omega t + \delta_x), \, 0 \le m \le 1 \quad (5)$$

where $\delta_x$ represents the initial angle of phase x, m is the modulation index, and defined as the peak of the ac-side output voltage $\hat{v}_{ac}$ divided by the half of $V_{dc}$ (m=$2\hat{v}_{ac}/V_{dc}$).

The voltages across the arm inductors and resistors are relatively small compared to the dc and ac-side voltages; thus, it can be ignored. The upper and lower arm voltages can be obtained from eqns. (3)-(5) as:

$$v_{u,x} = \frac{V_{dc}}{2} - m \frac{V_{dc}}{2} \sin(\omega t + \delta_x) \quad (6)$$

$$v_{l,x} = \frac{V_{dc}}{2} + m \frac{V_{dc}}{2} \sin(\omega t + \delta_x). \quad (7)$$

Figure 2:
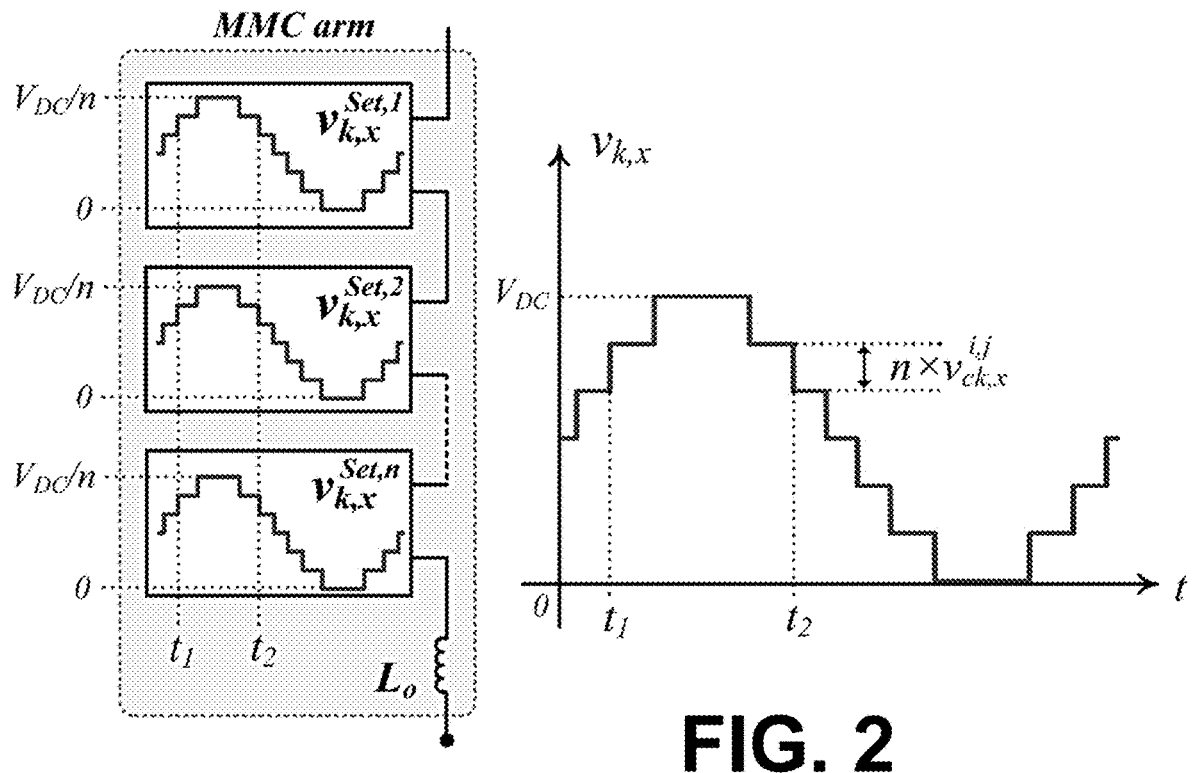
FIG. 2 illustrates an example of output waveforms of an MMC arm, in accordance with various embodiments of the present disclosure.

Each set, which has N SMs, produces an ac output voltage between 0 and $N \times v_{ck,x}^{i,j} = V_{dc}/n$. FIG. 2 illustrates typical output waveforms of an MMC arm. The i-th set output voltages of the upper $v_{u,x}^{set,i}$ and lower $v_{l,x}^{set,i}$ arms can be obtained as:

$$v_{u,x}^{set,i} = \frac{V_{dc}}{2n} - m \frac{V_{dc}}{2n} \sin(\omega t + \delta_x) \quad (8)$$

$$v_{l,x}^{set,i} = \frac{V_{dc}}{2n} + m \frac{V_{dc}}{2n} \sin(\omega t + \delta_x), \quad (9)$$

The sum of all arm set output voltages $v_{k,x}^{set,i}$ gives the arm output voltage $v_{k,x}$ (k=u, l). The arm output voltage can be expressed as:

$$v_{k,x} = \sum_{i=1}^{n} v_{k,x}^{set,i}. \quad (10)$$

The upper and lower arms should produce complementary voltages to ensure a proper output voltage under normal circumstances. The MMC ac-side voltage $v_{m,x}$ can be obtained by subtracting eqn. (3) from eqn. (4) as:

$$v_{m,x} = \frac{v_{l,x} - v_{u,x}}{2}. \tag{11}$$

The upper and lower arm currents of phase x are defined as:

$$i_{u,x} = i_{z,x} + \frac{i_x}{2} \tag{12}$$

$$i_{l,x} = i_{z,x} - \frac{i_x}{2} \tag{13}$$

where $i_x$ is the ac grid current of phase x and $i_{z,x}$ is the internal arm current of phase x.

By adding eqn. (3) to eqn. (4) and substituting for $i_{u,x}$ and $i_{l,x}$ from eqns. (12) and (13), the internal dynamic behavior of the MMC arms of phase x can be obtained as follows:

$$L_o \frac{di_{z,x}}{dt} + R_o\, i_{z,x} = \frac{V_{dc}}{2} - \frac{v_{u,x} + v_{l,x}}{2}. \tag{14}$$

From eqn. (14), the dynamic behavior of the internal arm currents can be directly affected by the sum of the arm voltages $v_{u,x}$ and $v_{l,x}$ while the ac-side voltage $v_{m,x}$ can be affected by the difference between the arm voltages as derived in eqn. (11). Consequently, deducting the same voltage quantity (e.g., $v^*_{z,x}$) from the upper and lower arms will affect the internal dynamic of MMC arms, and will not affect the MMC ac-side voltage $v_{m,x}$. Thus, the voltage references of the upper and lower arms of phase x are obtained by:

$$v^*_{u,x} = \frac{V_{dc}}{2} - v^*_{z,x} - v^*_{m,x} \tag{15}$$

$$v^*_{l,x} = \frac{V_{dc}}{2} - v^*_{z,x} + v^*_{m,x} \tag{16}$$

where $v^*_{z,x}$ represents the reference of the internal arm voltages of phase x and $v^*_{m,x}$ is the reference of the MMC ac-side voltage.

The reference of the internal arm voltages $v^*_{m,x}$ is used to suppress the circulating currents. A circulating current suppression control (CCSC) method can be implemented. The reference of the MMC ac-side voltage $v_{m,x}$ is provided from the main control system, which can be obtained by considering the amount of needed active, reactive power, and the dc bus voltage. In this paper, the conventional vector current control method-based d- and q-axes are implemented to develop the main control system.

MMC Scale-Up Control Design

Figure 3:
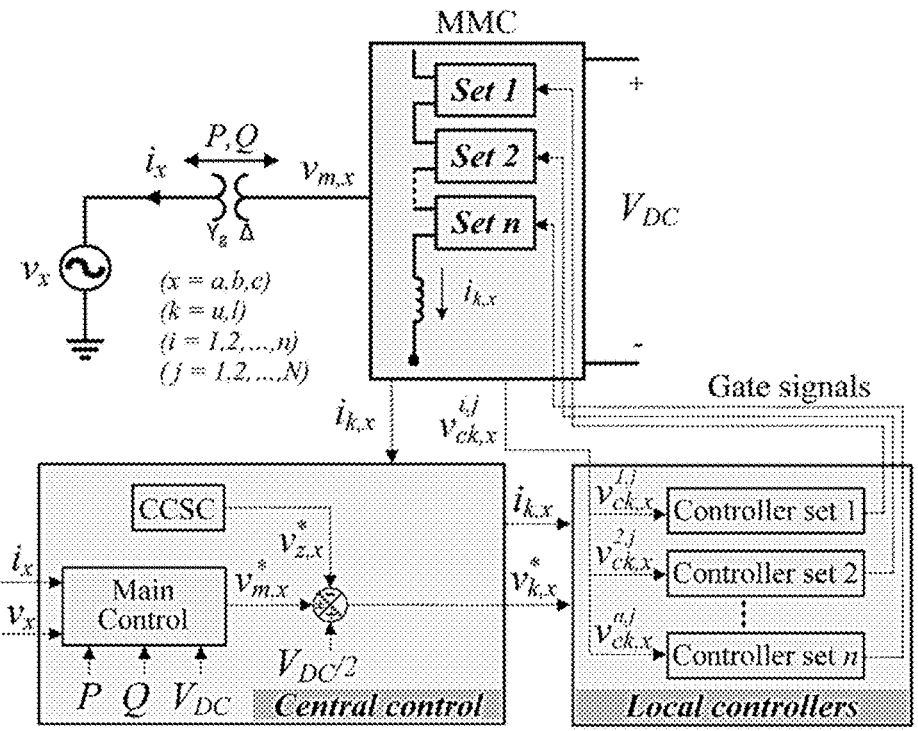
FIG. 3 illustrates an example of a structure of the MMC scale-up control system, in accordance with various embodiments of the present disclosure.

Basic Structure of MMC Scale-Up Control. The MMC control design comprises a central controller and local controllers for each set. FIG. 3 illustrates an example of a structure of the MMC scale-up control system. The system level control that includes the system measurements, main control, CCSC, and NLM can be implemented in the central control. The CVB control and gate signal generations can be assigned to the local controllers. The arm voltage command $v^*_{k,x}$ and arm current $i_{k,x}$ can be sent from the central controller to all local controllers of phase x and arm k. The SM numbers of each set to be inserted or bypassed can be identical among MMC arm sets. The SM capacitor voltages of each set can be independently sorted and ranked in ascending or descending order in the local controller. Every SM capacitor voltage of a set can be coordinated with the other SM capacitor voltages that have the same voltage ranks from the other sets.

SM Number Selection and Design. The stepped level numbers of the MMC ac-side voltage waveform mainly depend on the number of SMs per sets. The higher the number of SMs per sets, the higher the stepped level numbers of MMC ac-side voltages. Higher stepped level numbers of the MMC output voltage improve the ac-side voltage quality. N SMs per set can generate up to N+1 output voltage levels in a quarter period of time. Thus, the number of SMs per sets (N) should be properly selected to satisfy the THD specifications. An analytical method to calculate the THD of staircase voltage waveform can be used. The number of sets (n) should be selected to meet the voltage level requirements. Typically, the total number of SMs per arm $N_t$ is selected based on the dc bus voltage $V_{dc}$ and SM capacitor voltage $v_c$ as $N_t = V_{dc}/v_c$. The required number of set n can be calculated as:

$$n = \frac{V_{dc}}{N \times v_c}. \tag{17}$$

Changing the number of sets has a direct effect on the MMC voltage level and almost no impact on the MMC output voltage THD because the number of stepped level waveforms only depends on the number of SMs per set.

Figure 4A:
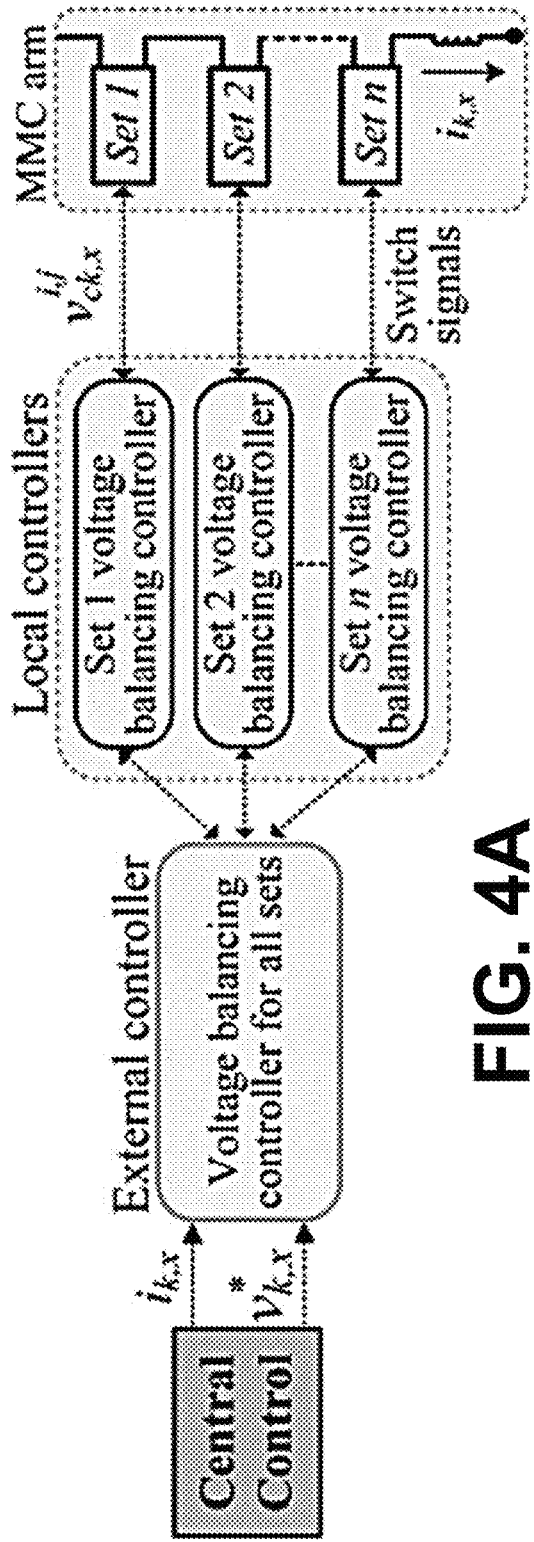
FIGS. 4A and 4B illustrate examples of existing distributed control design and the proposed scale-up control structure, in accordance with various embodiments of the present disclosure.

Scale-Up Control Design Flexibility. The exceptional improvement offered by the MMC scale-up control design is that the number of SMs can be conveniently extended to satisfy high voltage levels without changing the control system design that is needed for conventional MMC control designs. With the existing MMC decentralized control designs, an external controller is needed to coordinate the balancing control between sets as illustrated in FIG. 4A. The external controller is complicated and needs major control changes when adding more sets.

Figure 4B:
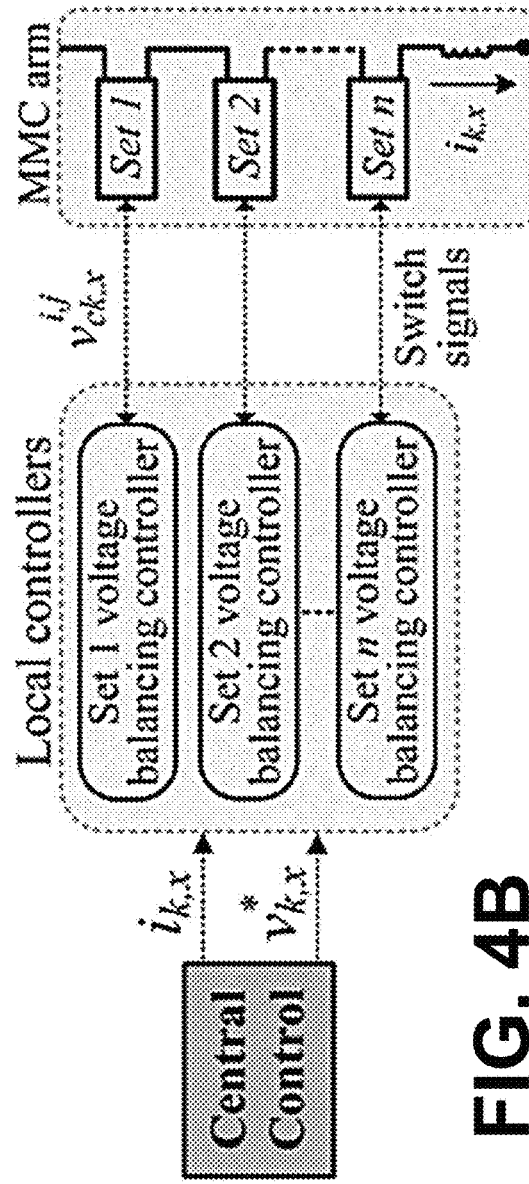

With the proposed MMC scale-up control design, the external controller is completely avoided as shown in FIG. 4B. Thus, the communication network between the local controllers and the external controller is not needed with the proposed control design. The CVB control and switch signals of each set are locally implemented in the controller. Adding a set of SMs to the MMC arms only needs an additional local controller for the CVB control and gate signal generations. Additional local controllers should communicate with the central control to receive the needed data such as the arm voltage command $v^*_{k,x}$ (or SM required numbers N on k,x when using the NLM technique) and the arm current $i_{k,x}$. All local controllers have the same hardware and software designs. This feature significantly increases the MMC flexibility for adding or removing SMs without changing the control design. Compared to existing control designs, the scale-up control design has higher flexibility in changing the number of sets without modifying and revalidation of the control design.

Figure 5:
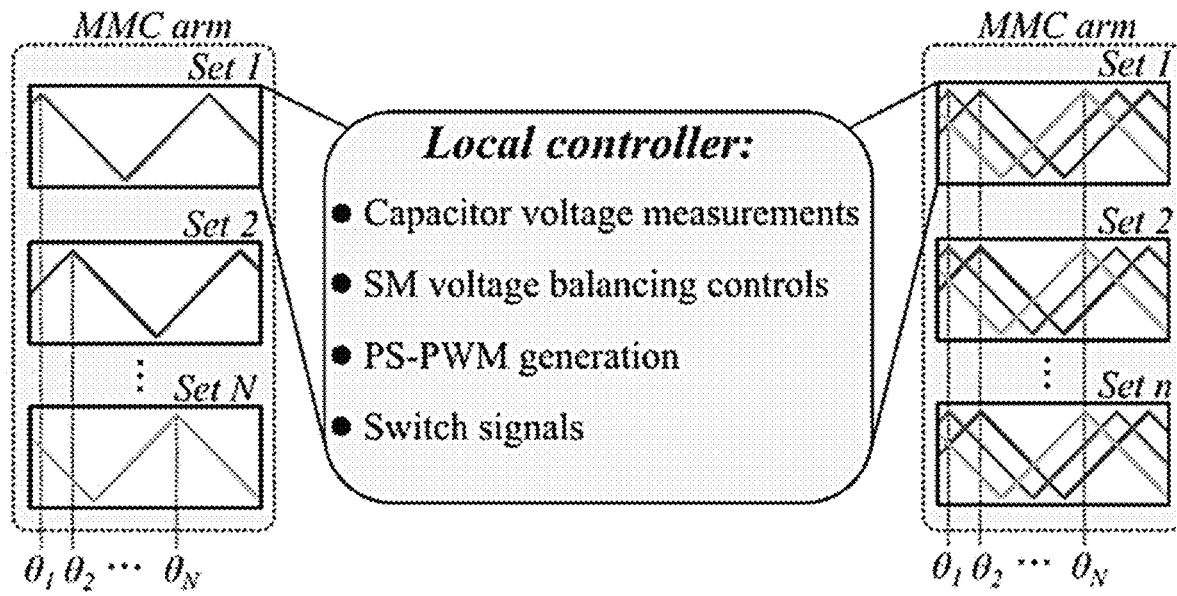
FIG. 5 illustrates an example of PS-PWM implementations for existing distributed control design and the proposed scale-up control strategy, in accordance with various embodiments of the present disclosure.

Implementation of the PWM Techniques. PWM techniques are difficult and complicated to be implemented with a high number of SMs because the number of carriers is quite high and the phase difference between carriers is considerably small, which eventually limits the control expandability. FIG. 5 illustrates examples for a PS-PWM implementation for existing distributed control design (left) and the proposed scale-up control strategy (rights). The existing distributed control design (left side of FIG. 5) utilizes N triangular carriers per MMC arm. Each set of SMs is assigned to a local controller for the balancing and internal dynamic control. However, each local controller requires a triangular carrier signal with a different phase displacement. Adding or removing sets needs major control changes because the triangular carrier arrangements of all local controllers have to be updated.

With the proposed control design, all local controllers have the same hardware and software where the phase displacements $\theta_j$ of the triangular carrier signals are locally and independently calculated in each local controller as shown on right side of FIG. 5. Thus, there is no need for updating the carrier signal arrangements when adding or removing a set of SMs, which increases the flexibility of changing the number of SMs. Different voltage levels can be fulfilled by adding more sets without major control changes. Thus, PWM techniques are feasible for high-power applications with the proposed MMC control design.

Figure 6:
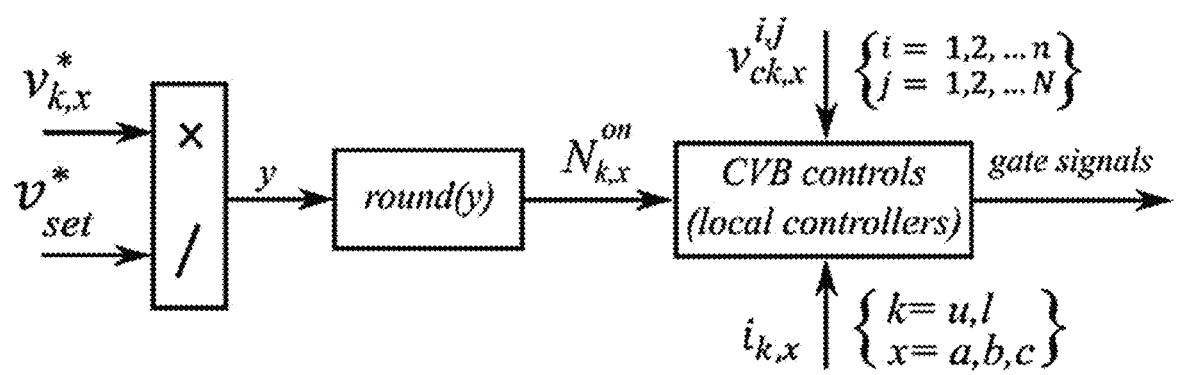
FIG. 6 illustrates an example of a nearest level modulation (NLM) technique for MMCs, in accordance with various embodiments of the present disclosure.

Implementation of the NLM Technique. The NLM is a very suitable technique for MMCs with a high number of SMs. FIG. 6 illustrates the overall diagram of the NLM technique. The references of upper and lower arm voltages $v^*_{k,x}$ are divided by the reference of the set output voltage $v^*_{set}$. The SM numbers per set are always maintained between 0 and N. The round function (round(y)) rounds the decimal fraction of the input y to the nearest whole number to calculate the SM number that is needed to be inserted into the system. The SM needed numbers $N_{k,x}^{on}$ can be calculated as follows:

$$N_{k,x}^{on} = \text{round}\left(\frac{v^*_{k,x}}{v^*_{set}}\right), 0 \leq N_{k,x}^{on} \leq N \quad (18)$$

$$v^*_{set} = \frac{V_{dc}}{N}. \quad (19)$$

Figures 7, 8:
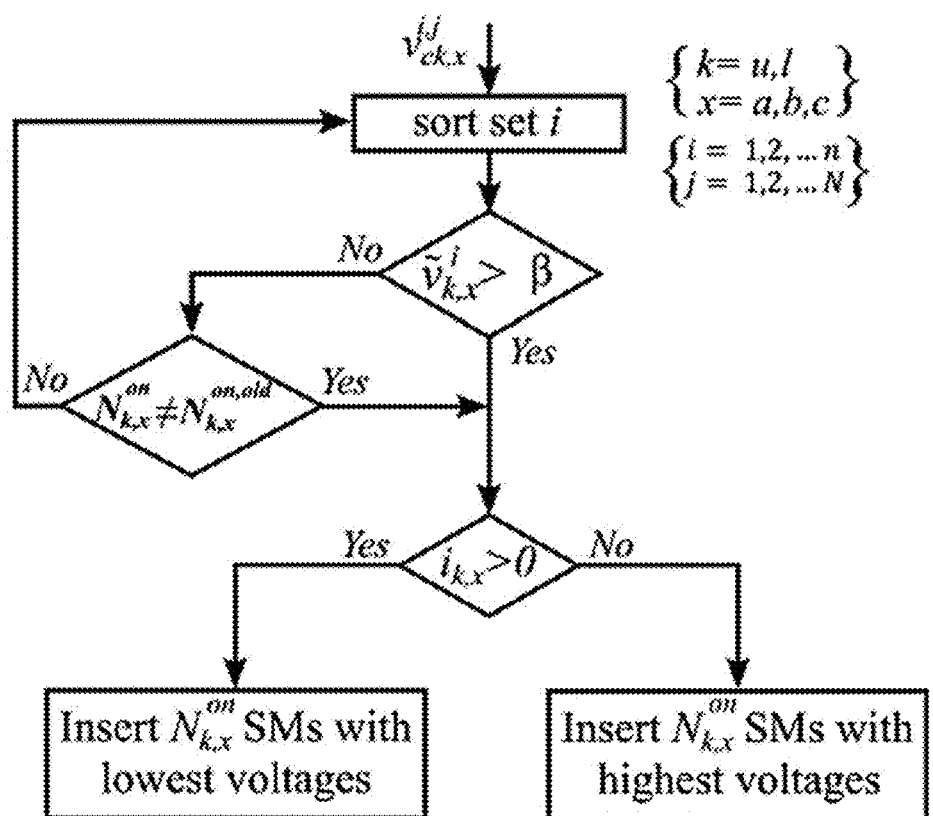
FIG. 7 is a table illustrating an example of FPGA resource requirements with different numbers of submodules (SMs), in accordance with various embodiments of the present disclosure.
FIG. 8 illustrates an example of a capacitor voltage balancing (CVB) algorithm that can be implemented in a local controller, in accordance with various embodiments of the present disclosure.

Implementation of Sorting Algorithm in FPGA. Sorting methods can be implemented as a CVB strategy of MMCs with the NLM technique. However, sorting hundreds of capacitor voltages in small time steps is very complex and is computationally intensive. With the MMC scale-up control, the total number of SMs ($N_t$=N×n) can be divided into n groups, and each group contains N SMs. The computational loads of $N_t$ SMs can be reduced to N SMs. Thus, the computational burden can be significantly reduced because the computational loads of sorting a high number of SM capacitor voltages are distributed between local controllers. For instance, treating 400 SMs per arm in a Xilinx Virtex-7 FPGA board utilizes about 42% and 33% of the FPGA lookup table (LUT) and flip-flop (FF) resources. However, the resource requirements of the FPGA are significantly reduced when the sorted number of SMs is reduced to 20 SMs per set as shown in the table of FIG. 7.

The sorting implementation in FPGAs can be achieved in series, parallel, or partial parallel. The series implementation takes longer time and fewer FPGA resources. The parallel implementation takes smaller time steps and more FPGA resources. The partial parallel implementation can be designed to provide a suitable combination of FPGA resources and time steps. The MMC scale-up control design with the NLM technique has lower computational load compared to existing control designs because the external balancing control is completely avoided with the proposed control design. The computational load of the external balancing control increases when the number of sets increases, which ultimately reduces the control expandability.

CVB Algorithm. Referring to FIG. 8, shown is an example of a CVB algorithm that can be implemented in each local controller. The capacitor voltages of each set are independently sorted and ranked in ascending order based on their voltage levels using conventional sorting algorithms such as the bubble sort. Although the sorting algorithm is executed every control cycle, which is a very small time, the gate signals will not be sent to the switching devices unless one of the two conditions is satisfied.

First, the difference between the maximum and minimum capacitor voltages $\tilde{v}_{k,x}^i$ of set i exceeds the setting value $\beta$. The $\beta$ value is selected to band the SM voltage deviations of each set within a specified range. A large $\beta$ value reduces the switching frequency, but it may lead to a higher ripple voltage or even unstable operation if not well selected. The difference capacitor voltage of set i is calculated as follows:

$$\tilde{v}_{k,x}^i = \max_{j=1,2,\ldots,N}\{v_{ck,x}^{i,j}\} - \min_{j=1,2,\ldots,N}\{v_{ck,x}^{i,j}\}. \quad (20)$$

Second, the SM numbers $N_{k,x}^{on}$, are changed from the previous control cycle. If the old SM required numbers $N_{k,x}^{on,old}$ are not equal to the current SM numbers $N_{k,x}^{on}$, gate signals have to be updated for all arm sets and sent to the switching devices.

The decision of which SM should be inserted or bypassed can be made based on the current direction and capacitor voltage levels. If the arm current is positive, which charges the capacitors, $N_{k,x}^{on}$ SMs with the lowest voltages are inserted into the system. If the arm current discharges the capacitors, $N_{k,x}^{on}$ SMs with the highest voltages are inserted into the system.

Real-Time Simulation Results

Study System. FIG. 9A shows an example of a PTP MMC-HVdc system implemented in the RTDS to verify the performance of the proposed MMC scale-up control design and CVB control under different operating conditions. The table of FIG. 9B lists the circuit parameters of the PTP MMC-HVdc system of FIG. 9A. MMC-1 controls the Grid-1 active and reactive power, while MMC-2 maintains the dc bus voltage and Grid-2 reactive power. The high-voltage side of the converter transformer is Y-connected with the neutral point grounded. The low-voltage side of the converter transformer is Δ-connected. The SM capacitor size is selected to maintain a ripple voltage within ±5% of the rated SM capacitor voltage at unity power factor. The SM capacitor size can be calculated as follows:

$$C = \frac{P}{3mN_t\omega\varepsilon v_c^2}\left[1-\left(\frac{mPF}{2}\right)^2\right]^{3/2} \quad (21)$$

where P is the rated power of the MMC, PF is the power factor, $\omega$ is the angular fundamental frequency, $v_c$ is the rated SM capacitor voltage, and $\varepsilon$ is the desired ripple voltage in percent of the rated SM capacitor voltage.

Although both MMCs employ 400 SMs per arm, the control designs of MMC-1 and MMC-2 are different. Different numbers of SMs per set can be selected for each MMC to validate the control design performance. The numbers of SMs per set for MMC-1 and MMC-2 were selected as 20 and 40, respectively. The number of sets per arm and the number of SMs per set for each MMC are illustrated in the table of FIG. 9C.

RTDS and MMC Support Unit Implementation. The PTP MMC-HVdc system was studied and modeled in the RTDS with a simulation sampling time of 50 μs. Each MMC system was emulated in an MMC support unit, which contains a Xilinx Virtex-7 FPGA board. Each MMC system needs one MMC support unit for the converter model and two additional FPGA boards: one for upper arm controls and the other one for lower arm controls. Fiber optic cables are used to connect the MMC support unit with its arm control FPGA boards. The ac sides of both MMCs were modeled in the NovaCor RTDS hardware based on a powerful multicore processor. FIG. 10 is an image of the RTDS and MMC support unit hardware. Two MMC support units and four FPGA boards were used to implement the PTP MMC-HVdc system in the RTDS. The MMC-1 and MMC-2 systems were optically connected to the RTDS in order to synchronize the entire MMC systems to the same time base.

Figures 11C, 12A, 12B:
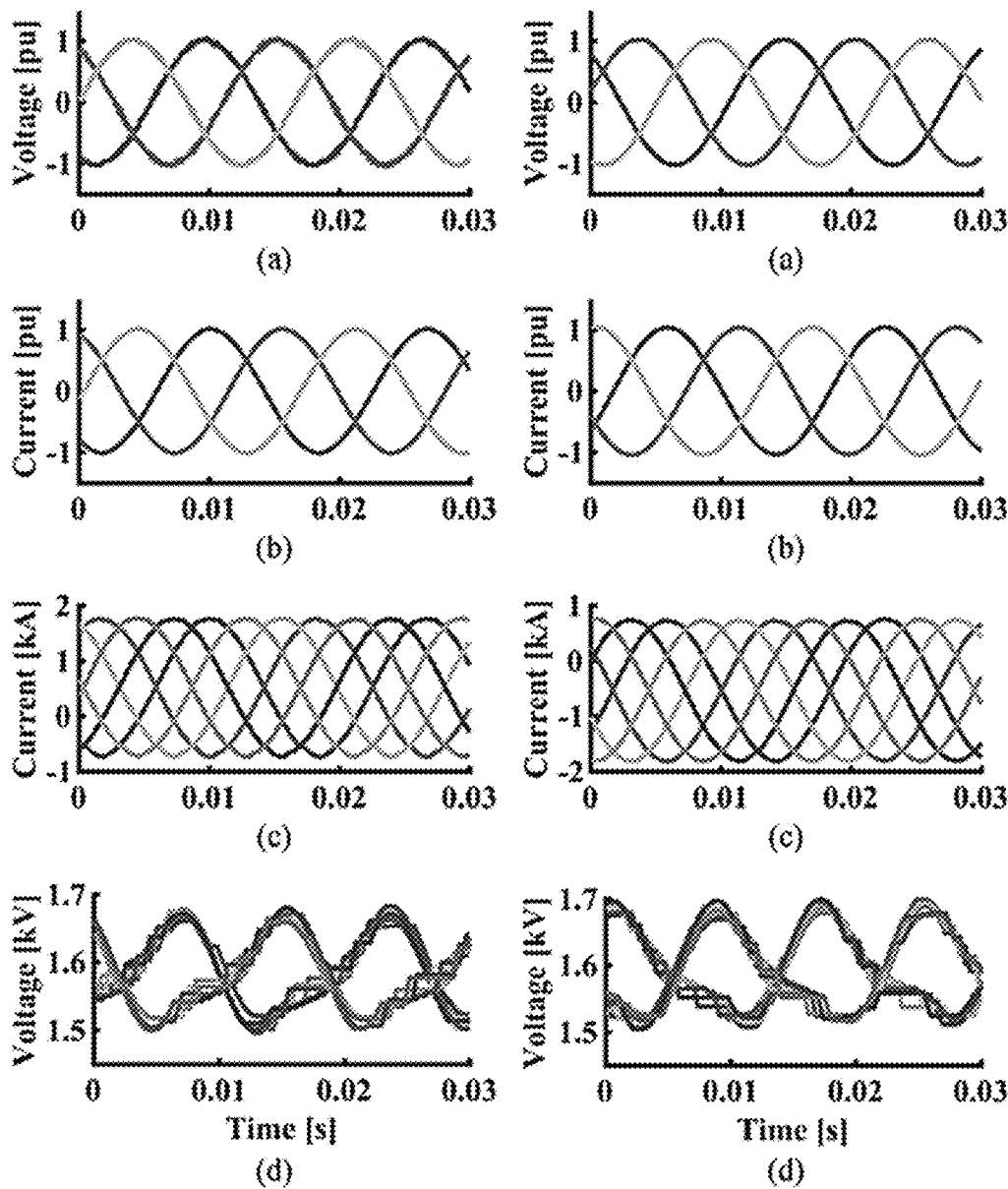

Impact of Different β Value Setting. The different β value setting has a significant impact on the switching frequency ($f_c$) and the capacitor ripple voltage. A higher β value results in a lower switching frequency and higher ripple capacitor voltages. FIGS. 11A and 11B shows the gate signal (upper plot) of one SM and eight capacitor voltages (lower plot) from set 1 with β=0.1 kV and β=0.01 kV, respectively. As seen in FIG. 11A, the capacitor ripple voltages with β=0.1 kV are higher compared to the capacitor ripple voltages in FIG. 11B with β=0.01 kV. The switching frequency (180 Hz) with β=0.1 kV is lower than the switching frequency (1140 Hz) with β=0.01 kV. The table of FIG. 11C lists the switching frequencies of MMC-1 with the different β values. For the PTP MMC-HVdc study system, with a β value of 0.032 kV, which is 2% of the SM capacitor voltage rating, the switching frequency is 540 Hz for all sets in MMC-1. The capacitor ripple voltage and switching frequency with β=0.032 kV are relatively low and hence considered for this case study.

Figure 13:
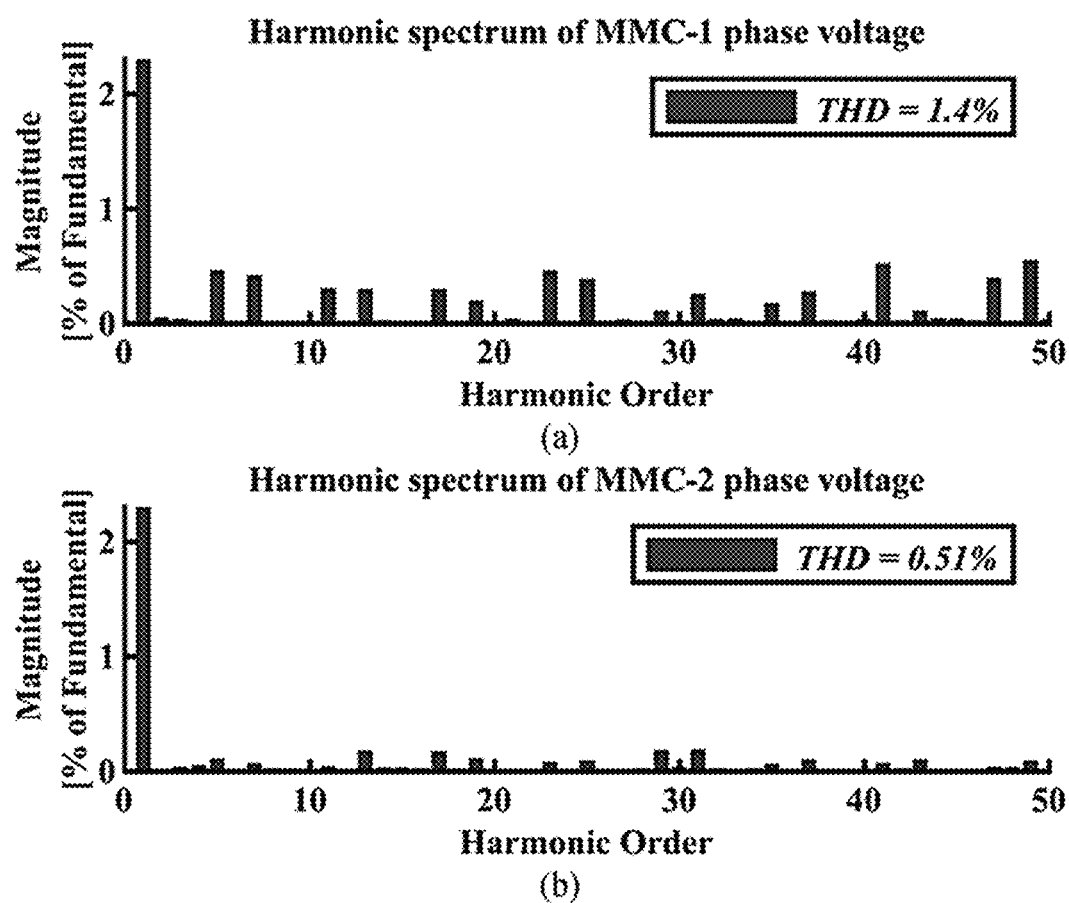
FIG. 13 illustrates an example of spectral analysis of phase output voltage of an MMC, in accordance with various embodiments of the present disclosure.

Performance Evaluation at the Steady State. The performance of the PTP MMC-HVdc system shown in FIG. 9A is evaluated at steady state. MMC-1 controls the Grid-1 active and reactive power at 1 and 0 pu, respectively. MMC-2 regulates the dc bus voltage and Grid-2 reactive power at 1 and 0 pu, respectively. The active power transfer is from MMC-2 to MMC-1. FIGS. 12A and 12B show the RTDS results of MMC-1 and MMC-2 at steady state, respectively. The results with β=0.032 at steady state include, from top to bottom, (a) AC output voltages, (b) grid currents, (c) arm currents, and (d) upper and lower arm capacitor voltages. The output voltage THD of MMC-1 is 1.4%, while the output voltage THD of MMC-2 is 0.51%. FIG. 13 illustrates the spectral analyses of the phase a output voltage of MMC-1 and MMC-2. MMC-2 has a better output voltage waveform quality compared to the MMC-1 output voltage waveform because the selected number of SMs per set of MMC-2 is twice the number of SMs per set of MMC-1. Therefore, MMC-2 tends to have a higher number of stepped voltage levels compared to MMC-1. The arm and grid currents of MMC-1 and MMC-2 are near-sinusoidal. The SM capacitor voltages are also well maintained at the nominal value of 1.6 kV with a ripple voltage of about ±5%.

Figure 14:
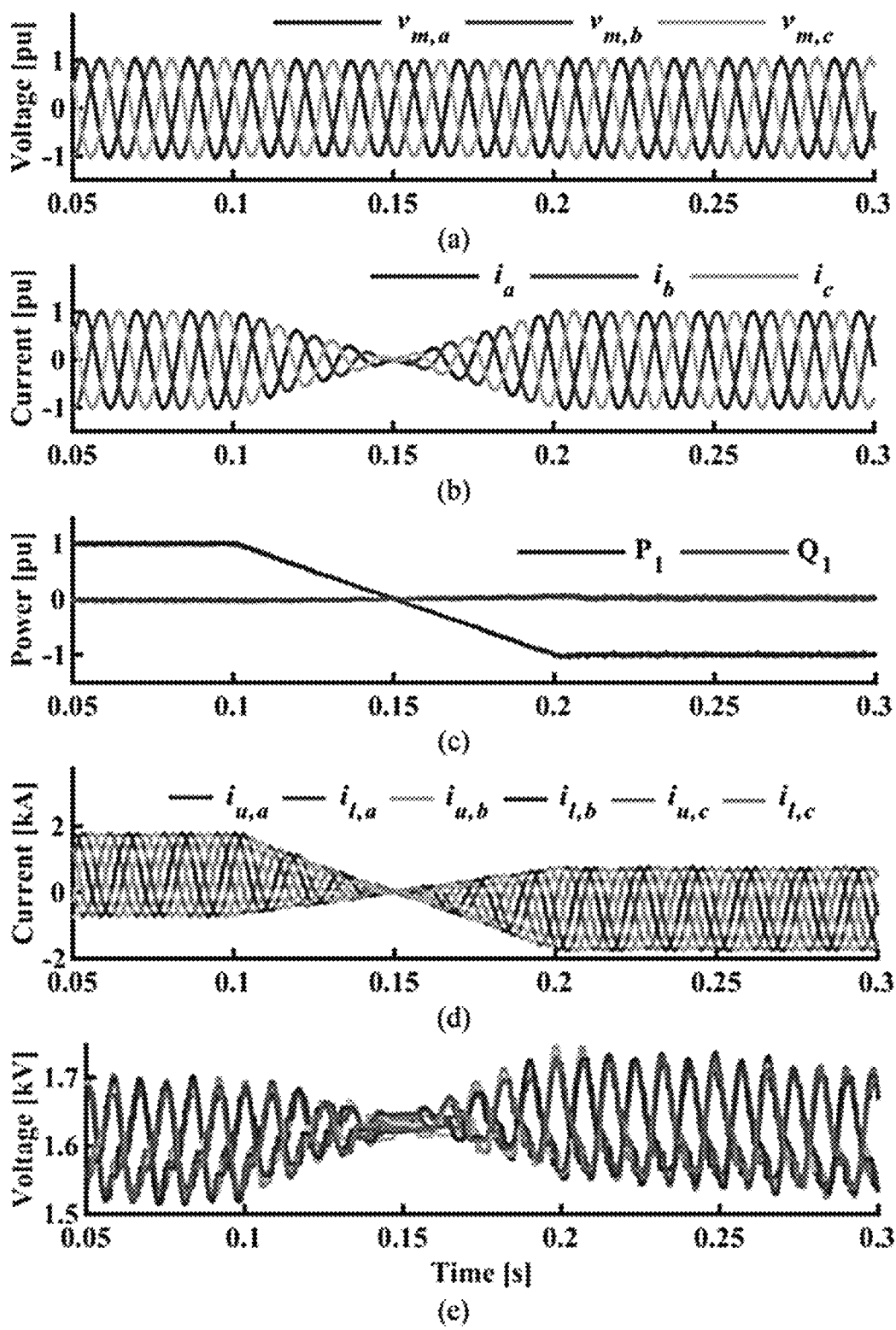
FIG. 14 illustrates an example of RTDS evaluation results at a transient state of an MMC, in accordance with various embodiments of the present disclosure.

Performance Evaluation at the Transient State. The MMC scale-up control design is verified under system transient when the active power of MMC-1 is ramped from 1 to −1 pu in 100 ms. The reactive power reference is kept 0 pu. FIG. 14 illustrates the RTDS results of MMC-1 at a transient state. FIG. 14 shows the MMC-1 output waveforms including, from top to bottom, (a) AC output voltages, (b) grid currents, (c) active and reactive power, (d) arm currents, and (e) upper and lower arm capacitor voltages. The active power and reactive power of MMC-1 are able to track their reference commands. The ac output voltages, grid currents, and arm currents are sinusoidal. Plot (e) of FIG. 14 provides the capacitor voltages of 16 SMs from the upper and lower arms of phase a. The SM capacitor voltages are well balanced and controlled within the desired boundaries.

Figure 15:
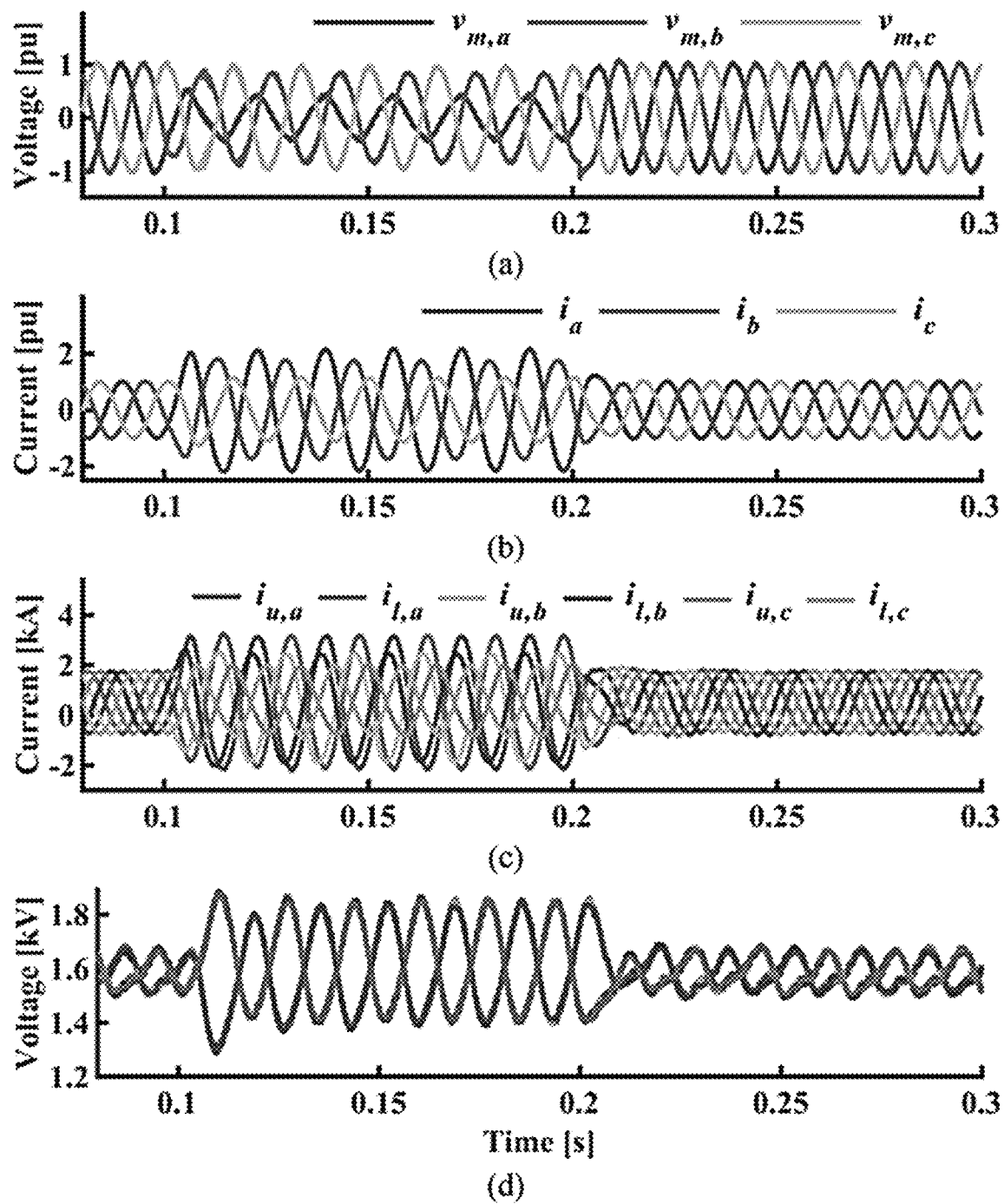
FIG. 15 illustrates an example of dynamic responses of an MMC, in accordance with various embodiments of the present disclosure.

Performance Evaluation at the Abnormal Condition. For evaluation of the proposed control design, a single line to ground (SLG) fault case is considered at the high-voltage side of the MMC-1 transformer. Initially, the active power and reactive power of MMC-1 are controlled at 1 and 0 pu, respectively. The SLG fault is initiated at t=0.1 s and cleared after 100 ms. FIG. 15 shows the dynamic responses of MMC-1 under a SLG fault including, from top to bottom, (a) AC output voltages, (b) grid currents, (c) arm currents, and (d) upper and lower arm capacitor voltages of phase a. The RTDS results show that the operation of PTP MMC system is stable and able to recover after the SLG fault is cleared. All capacitor voltages are well balanced and controlled at the rated value as shown in plot (d) of FIG. 15.

MMC Fault-Tolerance

Figure 16:
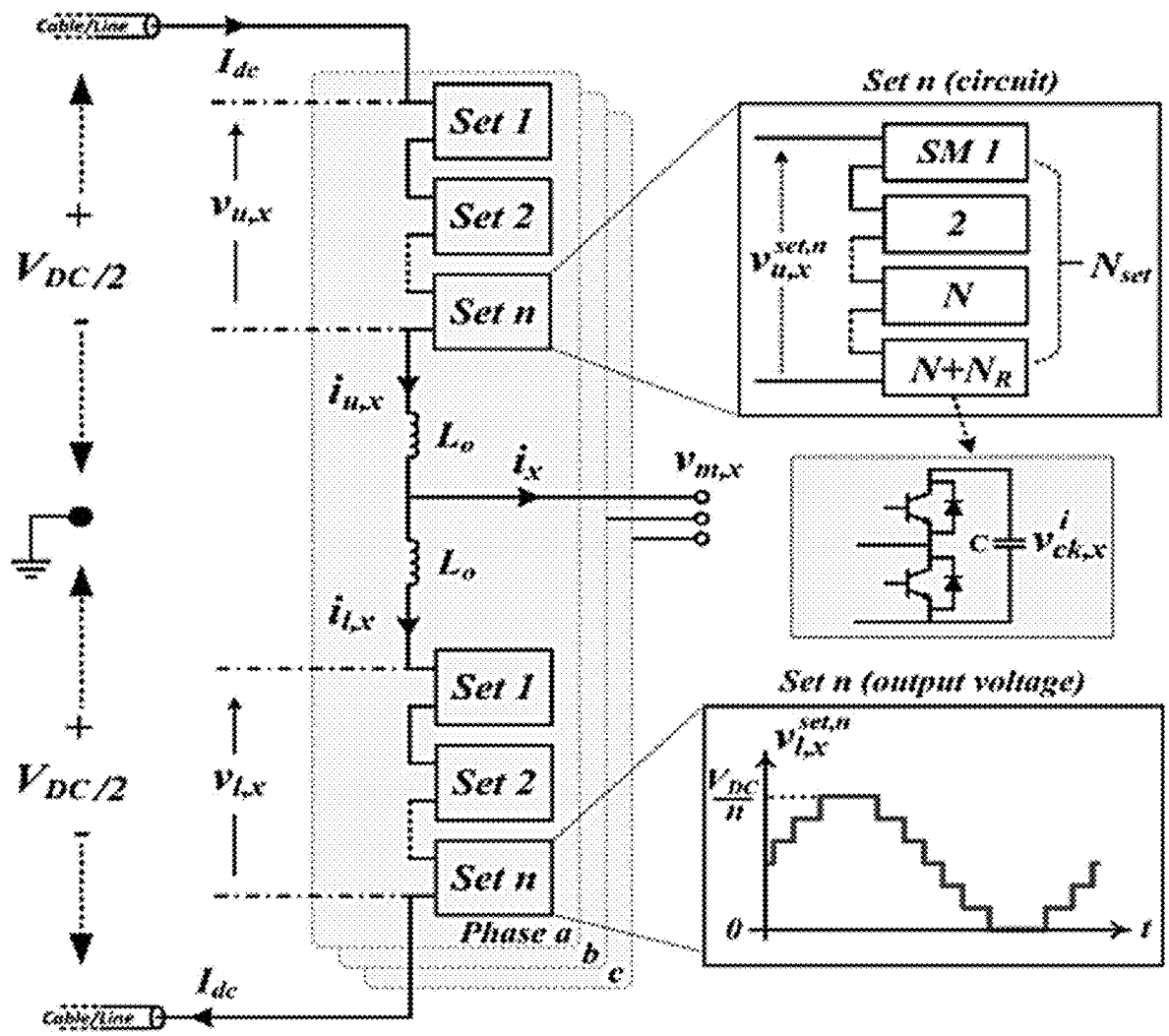
FIG. 16 illustrates an example of a MMC structure used for fault evaluation, in accordance with various embodiments of the present disclosure.

Referring now to FIG. 16, shown is a three-phase MMC circuit diagram comprising six arms. Each MMC phase contains an upper arm and a lower arm. Each arm comprises n sets of SMs and an inductor $L_o$. Each set has $N_{set}$ (=N+$N_R$) SMs cascaded in series, where N and $N_R$ are the number of basic and redundant SMs, respectively. Each arm has $N_{set} \times n$ SMs. Each set, which contains $N_{set}$ SMs, generates an AC voltage between 0 and $$\frac{V_{DC}}{n}$$

as shown in FIG. 16. The SM circuits can be half-bridge, full-bridge, hybrid, or other circuits. The subscript x and k indicate the MMC phase number (x=a, b, c) and arm number (k=u, l), respectively. i shows the set number (i=1, 2, . . . , n). The redundant SMs mainly substitute the faulty SMs to keep the MMC system fully functional under SM failures. The MMC SM ratings are typically designed based on the basic number of SMs N. Thus, the SM voltage rating $v^*_c$ should be selected as:

$$v^*_c \geq \frac{V_{DC}}{n \times N} \quad (22)$$

where $V_{DC}$ is the DC bus voltage, $v^*_c$ is the SM capacitor voltage rating, N is the basic number of SMs per set, and n is the number of sets per arm.

By utilizing the redundant SMs, the SMs can operate at a lower voltage level as follows:

$$v_c = \frac{V_{DC}}{n \times N_{set}} \quad (23)$$

where $v_c$ is the SM capacitor voltage with utilizing the redundant SMs, $N_{set}$ is the number of SMs per set (including the redundant SMs $N_R$).

$$v_{u,x} = \frac{V_{DC}}{2} - L_o \frac{di_{u,x}}{dt} - R_o\, i_{u,x} - v_{m,x} \quad (24)$$

$$v_{l,x} = \frac{V_{DC}}{2} - L_o \frac{di_{l,x}}{dt} - R_o\, i_{l,x} + v_{m,x} \quad (25)$$

where $i_{u,x}$ and $i_{l,x}$ are the currents of the upper and lower arms, respectively, $v_{m,x}$ is the MMC AC-side interface voltage, and $L_o$ and $R_o$ represent the MMC arm impedance. The resistance of the arm inductor is negligible; thus, it can be ignored. The i-th set output voltages of the upper arm $V_{u,x}^{set,i}$ and the lower arm $v_{l,x}^{set,i}$ can be obtained as:

$$v_{u,x}^{set,i} = \frac{v_{u,x}}{n} = \frac{V_{DC}}{2n} - \frac{v_{m,x}}{2n} \quad (26)$$

$$v_{l,x}^{set,i} = \frac{v_{l,x}}{n} = \frac{V_{DC}}{2n} + \frac{v_{m,x}}{n} \quad (27)$$

If the circulating current, which typically has a double-line frequency oscillation, is suppressed, the currents of the upper and lower arms can be defined as:

$$i_{u,x} = \frac{I_{dc}}{3} + \frac{i_x}{2} = i_{dc,x} + \frac{i_x}{2} \quad (28)$$

$$i_{l,x} = \frac{I_{dc}}{3} - \frac{i_x}{2} = i_{dc,x} - \frac{i_x}{2} \quad (29)$$

where $i_x$ is the AC-side current of phase x, $I_{dc}$ is the DC-side current, $i_{dc,x}$ is the MMC internal DC current of phase x.

MMC Control System

Figure 17:
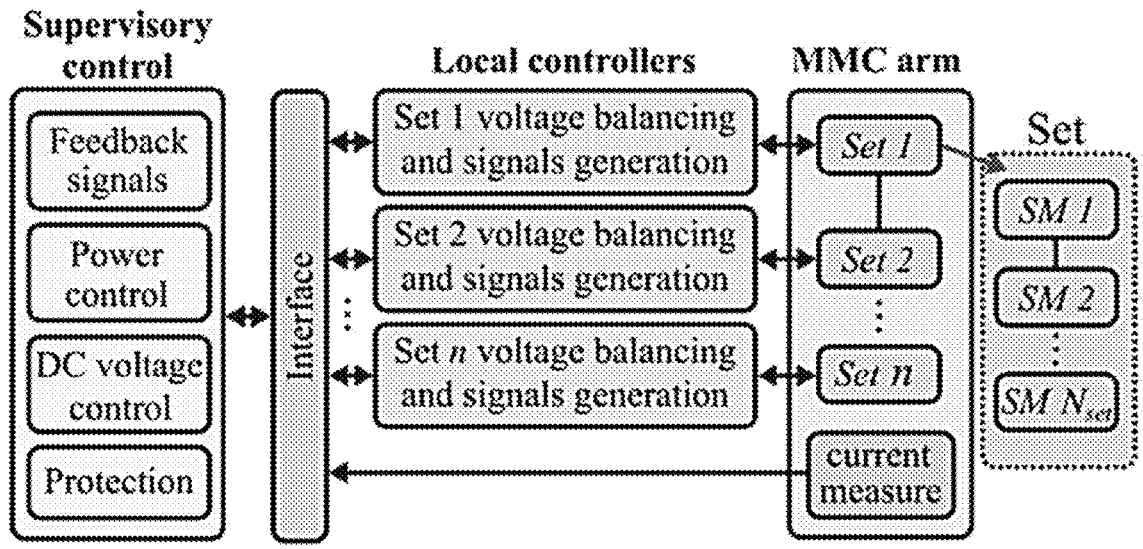
FIG. 17 illustrates an example of a structure of the proposed MMC control methodology, in accordance with various embodiments of the present disclosure.

MMC Control Architecture. FIG. 17 illustrates an example of the structure of the proposed MMC control methodology. The supervisory control mainly manages the system-level controls, including the current controls, voltage controls, and overall system protection. A local controller can be assigned to each set of SMs for the voltage balancing control and generation of gating pulses, and the SM level protection. Each local controller can sort the SM capacitor voltages in ascending or descending order. Based on the sorting results, the switching state of each SM in the set is generated by the local controllers. The arm current and the number of inserted SMs ($N_{k,x}^{on}$) in the arm are sent from the supervisory (central) controller to the local controllers for the voltage balancing control. In the case of an SM failure, the local controller can generate a signal to isolate the failed SM. Then the MMC sets operate with unequal numbers of SMs after isolating the faulty SMs. A CVB control method for equal and unequal numbers of SMs is discussed in this disclosure. If the number of faulty SMs in a set exceeds the redundant number ($N_R$), a command signal is sent from the local controller to the supervisory control to shut-down the entire MMC system.

The AC output voltage quality performance can be predicted from the voltage performance of a single set. The number of SMs per set has a significant impact on output voltage performance. The selection of the number of basic SMs (N) per set should meet the minimum specified THD of the converter AC-side interface voltage, which can be up to 2% for HVDC systems. The DC, voltage level requirement, is achieved by choosing a proper number of sets per arm (n). The number of sets per arm (n) has almost no impact on MMC output performance.

Figure 18A:
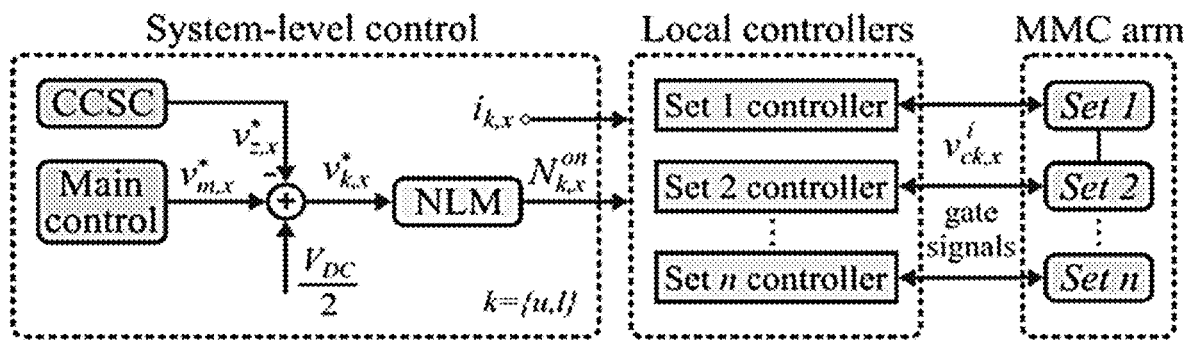
FIGS. 18A-18C illustrate examples of an overall control system, in accordance with various embodiments of the present disclosure.
Figure 18B:
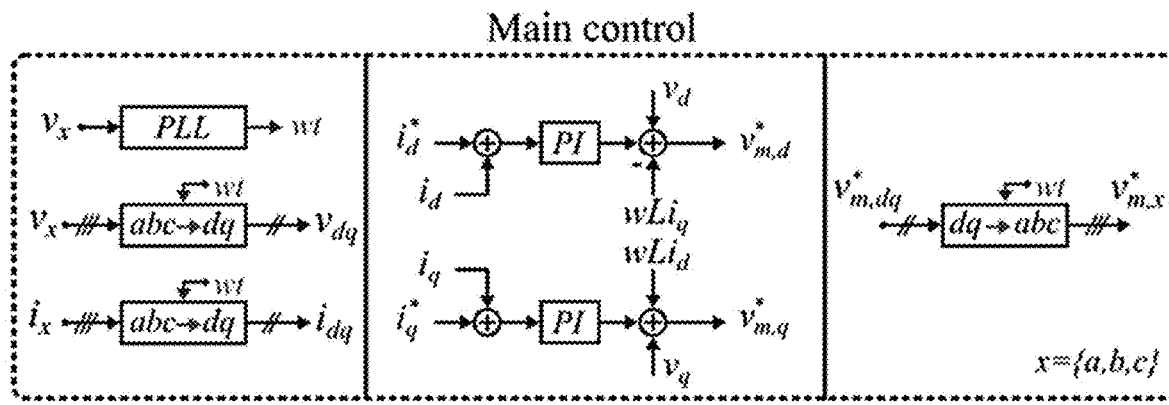
Figure 18C:
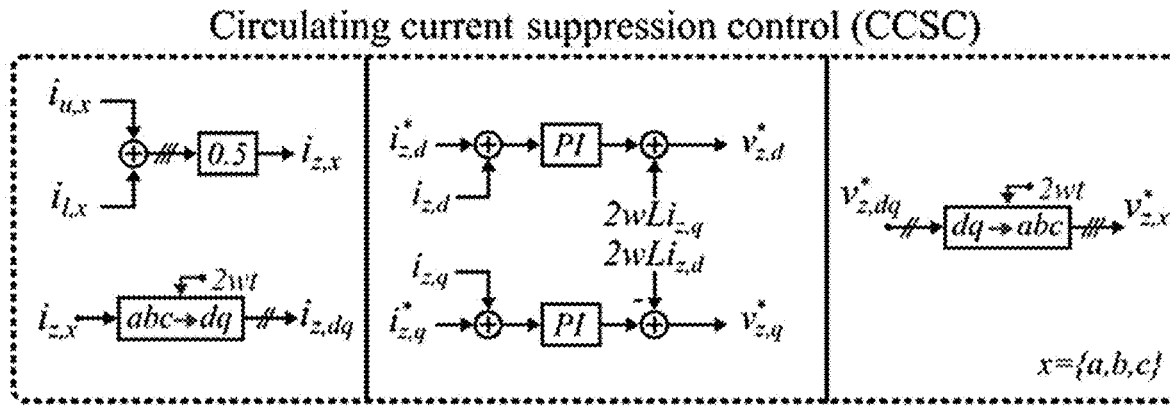

System-Level Control of MMC. The supervisory control can manage the system-level controls. FIG. 18A illustrates an example of the overall control system. The system-level control includes the main control, circulating current suppression control (CCSC), and the nearest level modulation (NLM) technique. The main control can be developed based on the conventional vector current in the dq synchronous reference frame as shown in FIG. 18B. The current control is needed to generate the voltage reference $v^*_{m,x}$. The circulating current suppression control (CCSC) strategy can be applied, as shown in FIG. 18C. The references for the upper and lower arm voltage $v^*_{k,x}$ are obtained by:

$$v^*_{u,x} = \frac{V_{DC}}{2} - v^*_{z,x} - v^*_{m,x} \quad (30)$$

$$v^*_{l,x} = \frac{V_{DC}}{2} - v^*_{z,x} + v^*_{m,x} \quad (31)$$

where $v^*_{z,x}$ is the reference command for the circulating current control, $v^*_{m,x}$ is the reference command for the AC-side voltage control. The NLM technique determines the number of inserted SMs $N_{k,x}^{on}(\ )$ in an arm, which is needed by each local controller.

Local Controllers. Typically, the nearest level modulation (NLM) together with a sorting algorithm can be used for the MMC submodules (SMs) voltage balancing with a large number of SMs. Sorting all SM voltages on a single controller would be a tremendous computational burden to the control system. Also, the communication load on the FPGA cam be substantial and the execution time may not be sufficient in each control cycle. With the proposed control structure method, the computational burden of sorting a high number of SMs and also the communication load are distributed among local controllers where the total number of SMs is divided into sets (e.g., n sets) with a smaller number of SMs per set (e.g., $N_{set}$). $N_{set}$ signals can be sent from/to each local controller through optical fiber communication instead of sending $N_{set} \times n$ signals to a central controller. Thus, the computational and communication loads of the control structure will be reduced in each controller. For example, sorting 400 SMs in Xilinx Virtex-7 FPGA board requires about 42% of the FPGA resources while sorting 20 SMs only requires about 18% of the FPGA resources. As a result of distributing the computational load between the groups, the sorting process time and communication in the control system are lower and take less time because the sorting process can be achieved in parallel.

The SM voltage balancing and SM level protection of the sets can be accomplished within the corresponding local controllers without communication between local controllers. Because all local controllers can have exactly the same hardware and software structure, changing the number of SMs can be achieved without major control changes. Therefore, the MMC system can easily be extended to satisfy high voltages. The test and revalidation of the MMC control, which is typically needed in the conventional MMC control design with every change in the number of SMs, are not needed with the proposed control method.

Submodule Level Fault-Tolerant Approach

Set Output Voltage Characteristics and Analysis. The fundamental component of the MMC AC-side interface voltage $v_{m,x}$ and grid current $i_x$ of phase x can be represented as follows:

$$v_{m,x} = m\frac{V_{DC}}{2}\sin(\omega t + \delta_x) \quad 0 \le m \le 1 \quad (32)$$

$$i_x = I_x \sin(\omega t + \varphi_x) \quad (33)$$

where m is the modulation index, $I_x$ is the amplitude of the AC grid current in phase x, $\omega$ is the angular frequency, $\delta_x$ is the initial voltage angle, and $\varphi_x$ indicates the phase-shift between the voltage and current in phase x.

Due to the identical operating principles among MMC arms and for the sake of simplicity, a single MMC arm (e.g., upper arm) can be taken as an example to elaborate the subsequent analysis. Substituting eqns. (32) and (33) into eqns. (26) and (28), the i-th set output voltage of the upper arm $v_{u,x}^{set,i}$ and the upper arm $i_{u,x}$ current can be obtained as follows:

$$v_{u,x}^{set,i} = \frac{V_{DC}}{2n}[1 - m\sin(\omega t + \delta_x)] \quad (34)$$

$$i_{u,x} = i_{dc,x} + \frac{I_x}{2}\sin(\omega t + \varphi_x) \quad (35)$$

From eqns. (23) and (34), the output voltage of the i-th set $v_{u,x}^{set,i}$ can be represented as follows:

$$v_{u,x}^{set,i} = \frac{v_c N_{set}}{2}[1 - m\sin(\omega t + \delta_x)] \quad (36)$$

The output voltage of the i-th set $v_{u,x}^{set,i}$ with faulted SMs can be expressed as follows:

$$v_{u,x}^{set,i} = \frac{v_c (N_{set} - F_{u,x}^i)}{2}[1 - m\sin(\omega t + \delta_x)] \quad (37)$$

where $F_{u,x}^i$ is the number of faulty SMs in the i-th set. The output voltage of the i-th set $v_{u,x}^{set,i}$ can be rewritten as:

$$v_{u,x}^{set,i} = M_{u,x}^i v_{u,x} \quad (38)$$

$$M_{u,x}^i = \frac{N_{set} - F_{u,x}^i}{n \times N_{set}} \quad (39)$$

where $M_{u,x}^i$ is the voltage coefficient of the i-th set.

The output voltages of all sets should always be the same to ensure the MMC arm's safe operation under both healthy and SM fault conditions. Thus, the following condition should be fulfilled under all operating conditions:

$$v_{u,x}^{set,1} = v_{u,x}^{set,2} = \cdots = v_{u,x}^{set,n} = \frac{v_{u,x}}{n} \quad (40)$$

From eqns. (37) and (40), the SM capacitor voltages of the i-th set $v_{cu,x}^i$ should be maintained in the normal and SM fault conditions as follows:

$$v_{cu,x}^i = \frac{N_{set} v_c}{(N_{set} - F_{u,x}^i)} \quad (41)$$

When an SM from any set is bypassed, the SM capacitor voltages of the faulty set can be increased to maintain the same output voltage of the faulty set prior to the SM failures. The other SMs of the healthy sets maintain the same voltage level before SM failures. The faulty SMs can be replaced with a relatively minor adjustment to SM capacitor voltages of faulty sets without changing all SM capacitor voltages in the faulty arm.

The average energy of the MMC arm and set should always be kept zero to prevent the continual delivering or absorbing the energy of SM capacitors. The average energy of the i-th set $\overline{E}_{u,x}^i$ under normal conditions (e.g., $F_{u,x}^i=0$) can be obtained as:

$$\begin{aligned}\overline{E}_{u,x}^i &= \frac{1}{T}\int_0^T \frac{v_{u,x}}{n} i_{u,x} dt \\ &= \frac{V_{DC}}{2n}\left(I_{dc,x} - \frac{I_x m}{4}\cos\varphi_x\right) \\ &= 0\end{aligned} \quad (42)$$

where T is the fundamental cycle. The DC current flowing in the MMC arm $i_{dc,x}$ can be concluded from eqn. (42) as follows:

$$I_{dc,x} = \frac{I_x m}{4}\cos\varphi_x \quad (43)$$

The DC power component in the MMC arms results in a continual delivering or absorbing SM capacitors' energy, which eventually leads to unbalanced voltages. The DC current of MMC arms should always be kept as derived in eqn. (43) to eliminate the MMC arm's DC power component.

The i-th set with faulty SMs has a slightly different output voltage waveform than the original voltage waveform (e.g., the output voltage of a healthy set). This voltage difference is produced because of the voltage coefficient $M_{u,x}^i$ and the rounding function of the NLM technique. Therefore, the output voltage of the i-th set with faulted SMs $v_{u,x}^{set,i}$ can be defined as follows:

$$v_{u,x}^{set,i} = \frac{v_{u,x}^{DC,i}}{2}[1 - m_{u,x}^i \sin(\omega t + \delta_x)] \quad (44)$$

where $v_{u,x}^{DC,i}$ represents the DC voltage of the i-th set, and $m_{u,x}^i$ is the modulation index of the i-th set (note that $m_{u,x}^i \ne m$). The average energy of the i-th set $\overline{E}_{u,x}^i$ with faulty SMs can be obtained as follows:

$$\overline{E}_{u,x}^i = \frac{1}{T}\int_0^T v_{u,x}^{set,i} i_{u,x} dt \quad (45)$$

-continued $$= \frac{v_{u,x}^{DC,i}}{2}\left(I_{dc,x} - \frac{I_x m_{u,x}^i}{4}\cos\varphi_x\right)$$

$$\neq 0$$

From eqn. (45), the faulty sets are always delivering or absorbing the energy of the SM capacitors, which results in a continual increase or decrease in the accumulated energy in the SM capacitors. The SM capacitor voltages of a faulted set (e.g., $F_{u,x}^i \neq 0$) should carefully be balanced to compensate for the missed SM voltages. The conventional sorting algorithm-based balancing methods are insufficient to perform the SM voltage balancing among sets. Thus, a new voltage balancing method is needed to balance the SM capacitor voltages among arm sets under normal and abnormal SM conditions.

Figure 19:
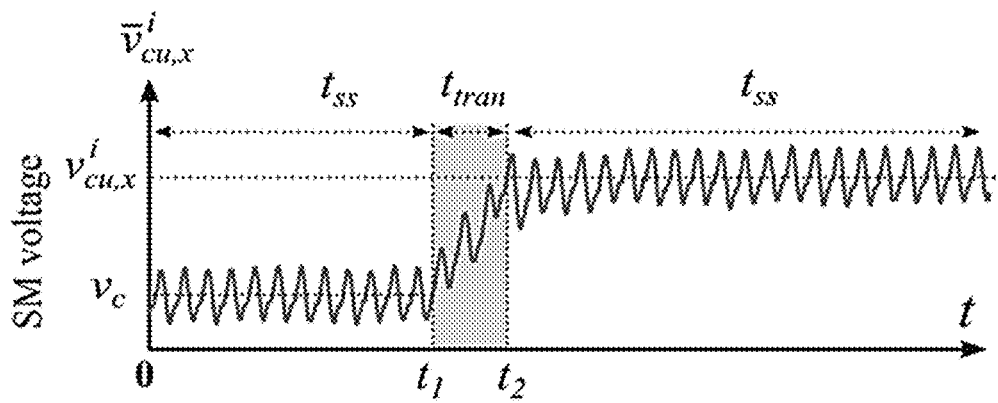
FIG. 19 illustrates an example of an SM voltage response with SM failures, in accordance with various embodiments of the present disclosure.

Voltage Balancing Method. FIG. 19 illustrates an example of an SM voltage response with SM failures. The SM capacitor voltages of a faulted set should increase to compensate for the missed SM voltages as shown. The capacitor voltage is increased from $v_c$ to $v_{cu,x}^i$ after faulty SMs are bypassed at $t_1$. The SM voltage reaches the new voltage level at $t_2$. The SM capacitor voltage should not exceed the rated SM voltage $v^*_c$ for safe operation.

The total amount of the capacitor voltages of the i-th set $v_{u,x}^{o,i}$, can be defined as follows:

$$v_{u,x}^{o,i} = (N_{set} - F_{u,x}^i)\bar{v}_{cu,x}^i \quad (46)$$

where $\bar{v}_{cu,x}^i$ represents the SM capacitor voltages of the i-th set before, during, and after SM failures. The reference voltage $v_{ref}^o$ for sets can be obtained as follows:

$$v_{ref}^o = N_{set}v_c \quad (47)$$

To ensure that the SM capacitor voltages of the i-th set can be balanced, the voltage difference $\Delta v_{u,x}^i$ between the reference voltage $v_{ref}^o$ and the total amount of capacitor voltages $v_{u,x}^{o,i}$ of the i-th set needs to be eliminated under normal and abnormal SM conditions. The voltage difference $\Delta v_{u,x}^i$ can be obtained as follows:

$$\Delta v_{u,x}^i = v_{ref}^o - v_{k,x}^{o,i} \quad (48)$$

The required number of inserted SMs of the arm $N_{u,x}^{on}$ is determined from the conventional NLM technique as:

$$N_{u,x}^{on} = \text{round}\left(\frac{v_{u,x}^*}{v_c}\right) \quad 0 \leq N_{u,x}^{on} \leq n \times N_{set} \quad (49)$$

The number of inserted SMs of the arm $N_{u,x}^{on}$ can be sent from the supervisory controller to all local controllers. Each local controller independently calculates the number of inserted SMs needed for the i-th set $N_{u,x}^{on,i}$ using the coefficient $M_{u,x}^i$ as follows:

$$N_{u,x}^{on,i} \times \text{round}(M_{u,x}^i)N_{u,x}^{on} \quad 0 \leq N_{u,x}^{on,i} \leq (N_{set} - F_{u,x}^i) \quad (50)$$

The number of inserted SMs of the i-th set $N_{u,x}^{on,i}$ can slightly be modified to balance the SM capacitor voltages of the i-th set. Thus, the number of inserted SMs of the i-th set can be modified as follows:

$$N_{u,x}^i = N_{u,x}^{on,i} \pm \Delta N_{u,x}^{on,i} \quad 0 \leq N_{u,x}^i \leq (N_{set} - F_{u,x}^i) \quad (51)$$

where $\Delta N_{u,x}^{on,i}$ is the additional inserted/bypassed number of SMs of the i-th set.

Figure 20:
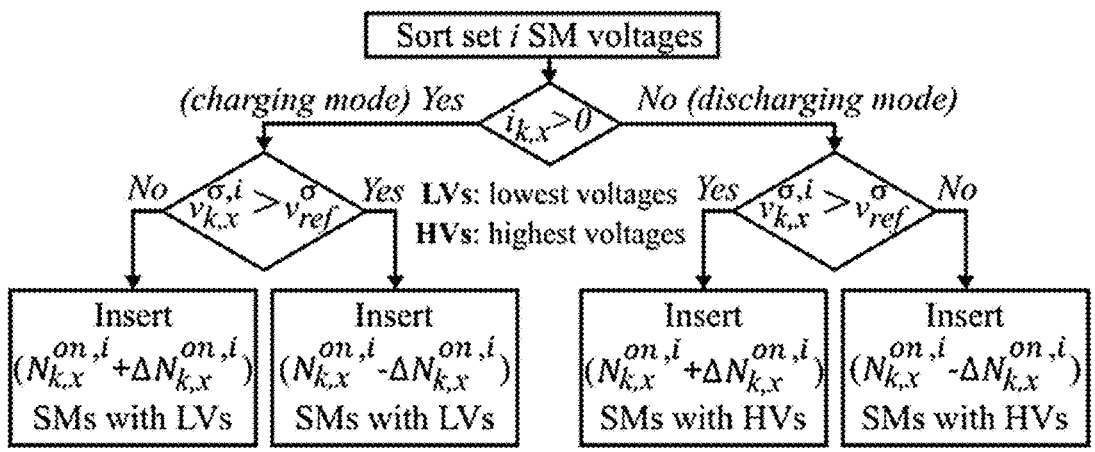
FIG. 20 illustrates an example of voltage balancing control implemented in a local controller, in accordance with various embodiments of the present disclosure.

FIG. 20 shows an example of the proposed voltage balancing control method implemented in each local controller. The determination of which SM should be inserted or bypassed can be achieved based on the arm current direction, SM voltage level, and the number of inserted SMs $N_{u,x}^i$. The number of inserted SMs of a set $N_{u,x}^i$ can be slightly modified based on the total amount of the capacitor voltages of the set $v_{u,x}^{o,i}$, and the reference voltage $v_{ref}^o$. For instance, if the arm current $i_{u,x}$ is in a charging mode (e.g., $i_{u,x} > 0$), $N_{u,x}^{on,i}$ SMs with lowest voltages should be inserted into the MMC arm. If the voltage $v_{u,x}^{o,i}$ is larger than the reference voltage $v_{ref}^o$, $N_{u,x}^{on,i}$ should be reduced by $\Delta N_{u,xon,i}$ to balance the set voltage. However, if the voltage $v_{u,x}^{o,i}$ is smaller than the reference voltage $v_{ref}^o$, additional $\Delta N_{u,x}^{on,i}$ SMs to $N_{u,x}^{on,i}$ are necessary to balance the set voltage. Typical MMC controllers rely on regulating each SM capacitor voltage. In contrast, the novel control method depends on balancing the set voltage within a bound of maximum and minimum voltages for each SM voltage and hence has a degree of freedom. This feature makes the controller more robust and reliable.

Changing the number of inserted SMs of the i-th set $N_{u,x}^i$ is essentially changing the modulation signal of that set to balance the set voltages. This balancing technique has a similar operating concept as the voltage-feedback loop-based voltage balancing, typically implemented with PWM techniques.

Selection of Additional Inserted/Bypassed Numbers of SMs ($\Delta N_{u,x}^{on,i}$). The total amount of the SM capacitor voltages of the i-th set while considering the voltage ripple can be defined as follows:

$$v_{u,x}^{o,i} = (N_{set} - F_{u,x}^i)(1 \pm \varepsilon^i)\bar{v}_{cu,x}^i \quad (52)$$

where $\varepsilon^i$ is the voltage ripple of the i-th set of SM capacitors. Assume that the faulty SMs are bypassed at $t=t_1$ while the SM voltages of the i-th set $\bar{v}_{cu,x}^i$ are still at the original value $v_c$ (e.g., $\bar{v}_{cu,x}^i = v_c$) as shown in FIG. 19. By substituting eqns. (47) and (52) into eqn. (48), the voltage difference $\Delta v_{u,x}^i$ at $t=t_1$ can be obtained as:

$$\Delta v_{u,x}^i(t_1) = [\pm \varepsilon^i(F_{u,x}^i - N_{set}) + F_{u,x}^i]v_c \quad (53)$$

The voltage difference $\Delta v_{u,x}^i$ mainly depends on the number of faulty SMs at $t=t_1$. Before the SMs fail (e.g., $t<t_1$), $\bar{v}_{cu,x}^i = v_c$. After the SM voltages are adjusted (e.g., $t \geq t_2$), $\bar{v}_{cu,x}^i = v_{cu,x}^i$. The voltage difference during the steady-state $\Delta v_{u,x}^i(t_{ss})$ (e.g., $t_1 > t > t_2$) can be obtained as follows:

$$\Delta v_{u,x}^i(t_{ss}) = (\pm \varepsilon^i)N_{set}v_c = (\pm \varepsilon^i)v_{ref}^o \quad (54)$$

The voltage difference $\Delta v_{u,x}^i$ used to estimate the additional inserted/bypassed number of SMs of the i-th set $\Delta N_{u,x}^{on,i}$ can be given as:

$$\Delta N_{u,x}^{on,i} = \text{Integer}\left(\frac{|\Delta v_{u,x}^i|}{v_{ref}^o \varepsilon^*}\right) \quad (55)$$

where $\varepsilon^*$ is the voltage ripple reference of the SM capacitors.

If the amount of the SM capacitor voltages of the i-th set $v_{u,x}^{o,i}$ is within the pre-specified region, which is $(v_{ref}^o - N_{set}v_c\varepsilon^*) \leq v_{u,x}^{o,i} \leq (v_{ref}^o + N_{set}v_c\varepsilon^*)$, the additional number of SMs is unnecessary (e.g., $\Delta N_{u,x}^{on,i} = 0$). Otherwise, an extra inserted/bypassed number of SMs $\Delta N_{u,x}^{on,i}$ is needed to balance the SM voltages of the i-th set. The extra inserted/bypassed SMs of a set $\Delta N_{u,x}^{on,i}$ changes based on the voltage difference $\Delta v_{u,x}^i$ of that set. The maximum required number of $\Delta N_{u,x}^{on,i}$ occurs at $t=t_1$ when the voltage difference $\Delta v_{u,x}^i$ is at the highest level. The number $\Delta N_{u,x}^{on,i}$ should be kept within a limited bound of minimum and maximum voltages to ensure safe operation. From eqns. (53) and (55), $\Delta N_{u,x}^{on,i}$ is almost equal to the number of faulty SMs $F_{u,x}^{i}$ at $t=t_1$, which is ideally the maximum number needed. As the number of faulty SMs should always be equal or less than the redundant SMs $N_R$, the boundary of $\Delta N_{u,x}^{on,i}$ can be maintained within the following range for safe operation under SM failures:

$$0 \leq \Delta N_{u,x}^{on,i} \leq N_R \tag{56}$$

Selection of Voltage Ripple Reference ($\varepsilon^*$). The selection of the voltage ripple reference $\varepsilon^*$ plays an important role in the MMC performance. Choosing the voltage ripple reference $\varepsilon^*$ may result in a higher THD in the arm current if it is not selected properly. Typically, the voltage ripple of an SM capacitor is less than ±10% of the rated SM capacitor voltage. Thus, the reference of voltage ripple $\varepsilon^*$ should be kept within ±10% to avoid significant deviations of the SM capacitor voltages. The SM capacitance C can be selected to satisfy the desired voltage ripple as follows:

$$C = \frac{P}{3\, m\, N_t\, \omega\, \varepsilon\, v_c^2}\left[1 - \left(\frac{m \cos \varphi_x}{2}\right)^2\right]^{\frac{3}{2}} \tag{57}$$

where P is the rated power of the MMC, $\cos \varphi_x$ is the power factor, $N_t$ is the total number of SMs per arm, and $\varepsilon$ is the desired ripple voltage in percent of the rated SM capacitor voltage.

The voltage ripple reference $\varepsilon^*$ should be larger than the voltage ripple of the SM capacitor voltages $\varepsilon^i$ in order to avoid the unnecessary additional inserted/bypassed number of SMs during steady-state conditions. The unnecessary changes in the number of SMs $N_{u,x}^{i}$ may lead to a significant impact on performance quality. Although it can be important to select the reference of voltage ripple $\varepsilon^*$ to be larger than the SM capacitor voltage ripple $\varepsilon^i$, a much larger $\varepsilon^*$ (e.g., $\varepsilon^* \gg \varepsilon^i$) may cause a significant voltage deviation of the set voltage. The reference of voltage ripple $\varepsilon^*$ should be selected to be somewhat larger than the SM capacitor voltage ripple $\varepsilon^i$.

Hardware in the Loop Real-Time Simulation Results

Figure 21A:
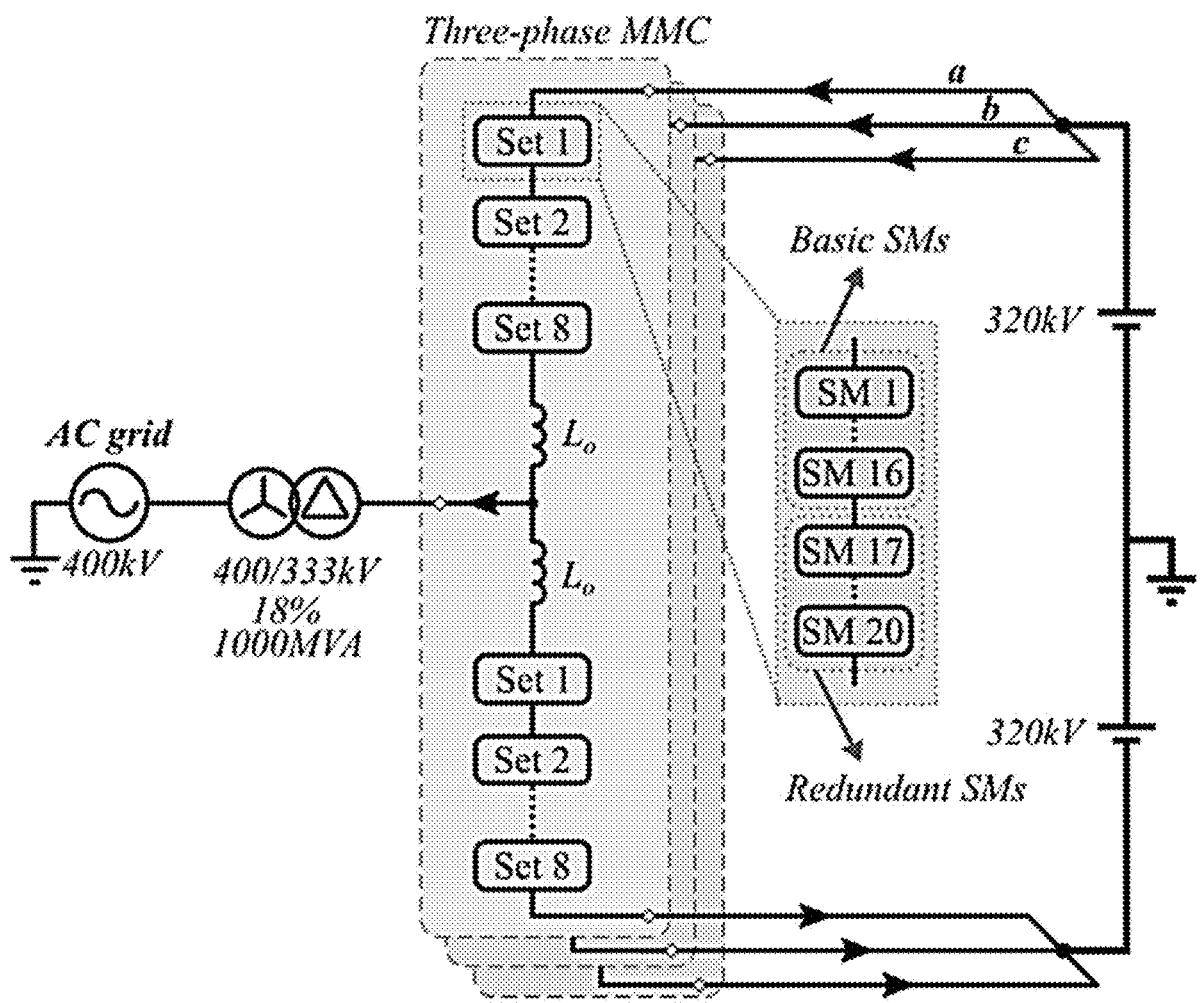

Study System and Hardware Implementation. The MMC-HVDC system shown in FIG. 21A was simulated in the RTDS system to verify the proposed fault-tolerant control method under SM failures. The prototype system parameters are listed in the table of FIG. 21B. The total number of SMs per arm is 160. Each arm comprises eight sets cascaded in series. Each set has 20 (=16+4) half-bridge SMs cascaded in series, where 16 and 4 are the number of basic and redundant SMs per set, respectively. The SM capacitor average voltage rating $$v_c^* = \frac{V_{DC}}{n \times N} = \frac{640 \text{ kV}}{8 \times 16} = 5 \text{ kV}.$$

utilizing the redundant SMs, the operating SM voltage is $$v_c = \frac{V_{DC}}{n \times N_{set}} = \frac{640 \text{ kV}}{8 \times 20} = 4 \text{ kV}.$$

The SM capacitor size was selected using eqn. (57) to keep the SM voltage ripple within ±5% of the SM capacitor voltage.

FIG. 22 shows the hardware in the loop real-time simulation system, which comprised an RTDS NovaCor real-time simulator, a GTFPGA unit, two Xilinx Virtex-7 FPGA boards, and fiber optic cables. The MMC's AC grid, which includes the converter transformer and AC grid voltage sources, is modeled in the NovaCor system. The supervisory control is also located in the NovaCor system. The MMC circuit model is emulated in the GTFPGA unit, and two FPGA boards are required for the MMC arm controls. The local controllers with the proposed balancing algorithm were programmed in the FPGA boards. The entire real-time simulation system was connected through high-speed fiber optic cables, as shown in FIG. 22.

Figure 23:
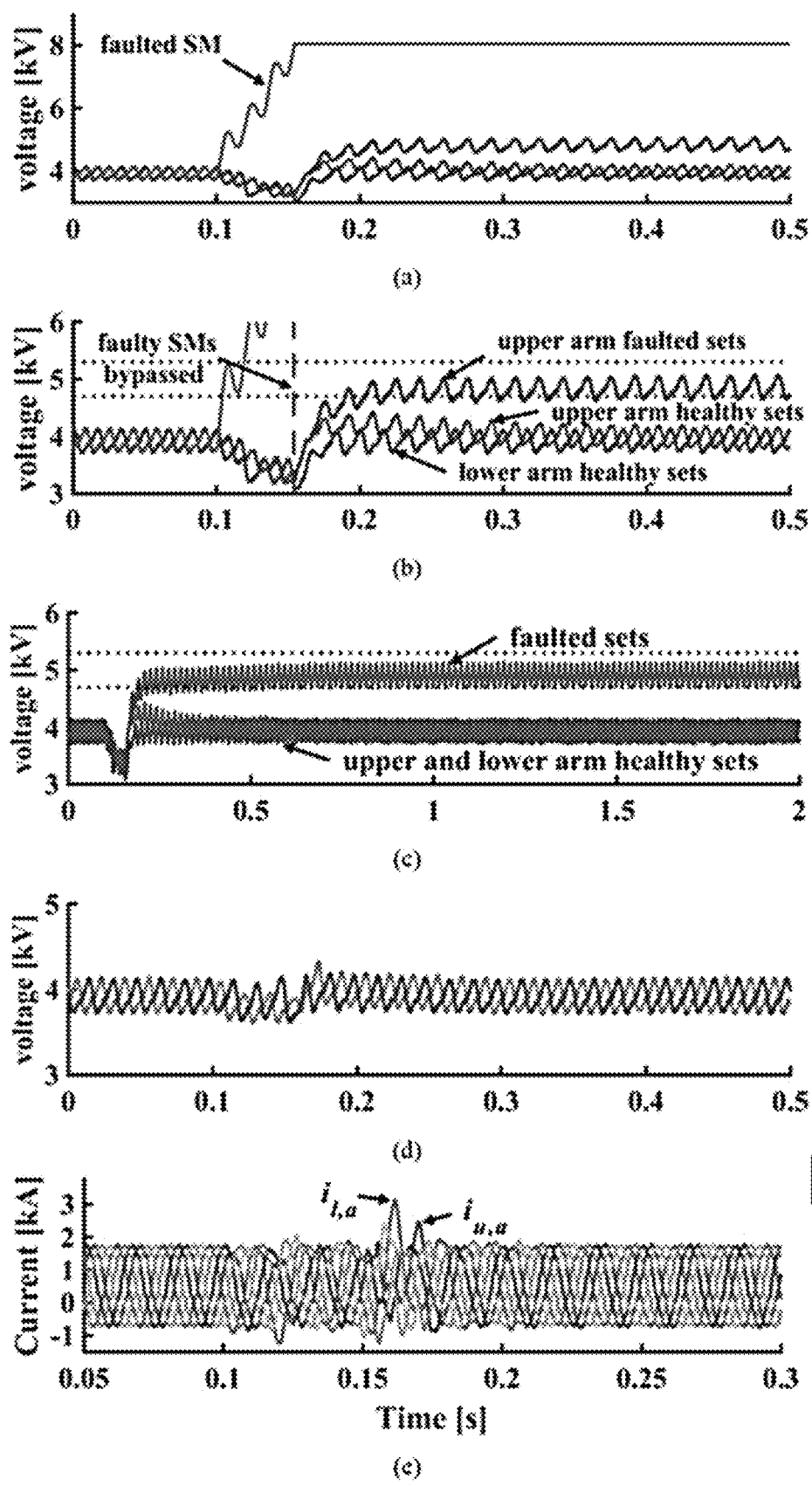
FIG. 23 illustrates an example of real-time simulation results of MCC failures, in accordance with various embodiments of the present disclosure.

MMC Operation with 16 SM Failures in an MMC Arm. Initially, the MMC system operates in an inverter mode with a unity power factor and full rated load. In order to validate the proposed voltage balancing method, an open-circuit fault was intentionally executed for 16 SMs of the upper arm of phase a. Four SMs from set 1, set 2, set 3, and set 4 (e.g., $F_{u,a}^{1}=F_{u,a}^{2}=F_{u,a}^{3}=F_{u,a}^{4}=4$) were failed at $t=0.1$ s. FIG. 23 illustrates real-time simulation results of the MCC failures including examples of (a) SM voltages of phase a with faulted SMs, (b) SM voltages of phase a, (c) SM voltages of phase a, (d) SM voltages of phase b, and (e) arm currents. The faulty SM voltages were significantly increased with the open-circuit faults.

When the SM capacitor voltage exceeded the threshold value (assumed 8 kV in this case), the SM was immediately bypassed, as shown in plot (a) of FIG. 23. Because the reference of the voltage ripple $\varepsilon^*$ was selected as 6%, the SM capacitor voltages of the sets, which have four SM failures, were increased to balance SM voltages between 4.7 kV and 5.3 kV (dotted lines shown in plot (b) of FIG. 23). The SM voltages of all healthy sets in upper and lower arms were kept the same without voltage changes. Plot (c) of FIG. 23 shows the SM capacitor voltages of the upper and lower arms of phase a for a longer period. Plot (d) of FIG. 23 shows the upper and lower arm SM capacitor voltages of phase b. All SM voltages of the faulty and healthy sets in all MMC arms were balanced within the desired boundaries under 16 SM failures. Plot (e) of FIG. 23 shows the MMC arm current performance with the proposed balancing method under 16 SM failures. The arm currents were balanced and well-controlled after the 16 SM failures.

Figure 24A:
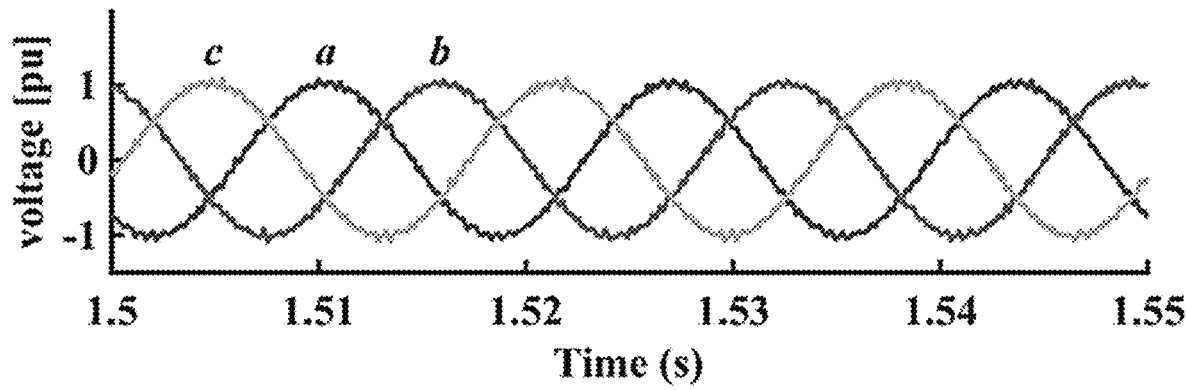
FIGS. 24A-24C illustrate examples of three-phase output voltages and three-phase grid currents of the MMC with SM failures, in accordance with various embodiments of the present disclosure.
Figure 24B:
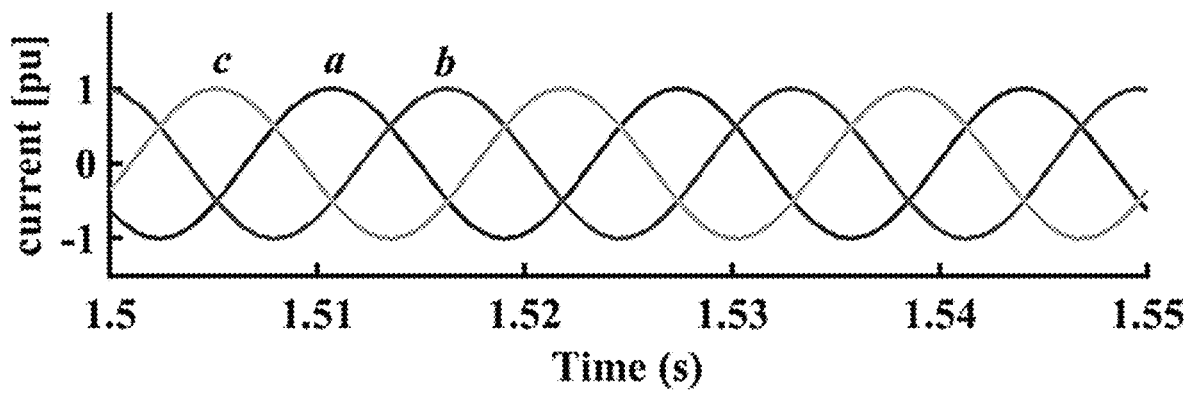
Figure 24C:
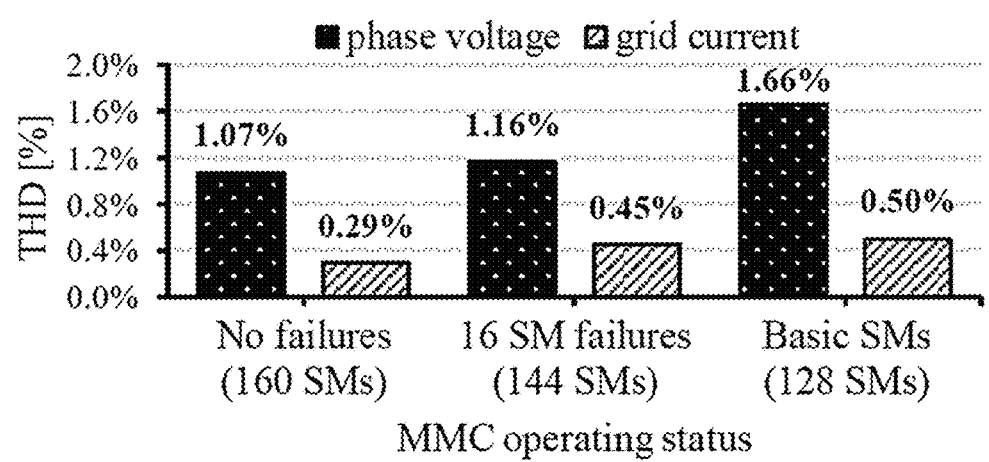

FIGS. 24A and 24B show the three-phase output voltages and three-phase grid currents of the MMC with the 16 SM failures. A comparison of the output voltage and current quality of phase a under different operating conditions is shown in FIG. 24C. The THDs of the phase voltage and grid current under normal operation (no SM failures and all redundant SMs operate as the basic SMs) were 1.07% and 0.29%, respectively. With the 16 SM failures, the THDs of voltage and current slightly increased to 1.16% and 0.45%, respectively, which are still well within acceptable limits. The worst MMC output quality happens when the MMC operates with the basic SMs (no redundant SMs).

Figure 25:
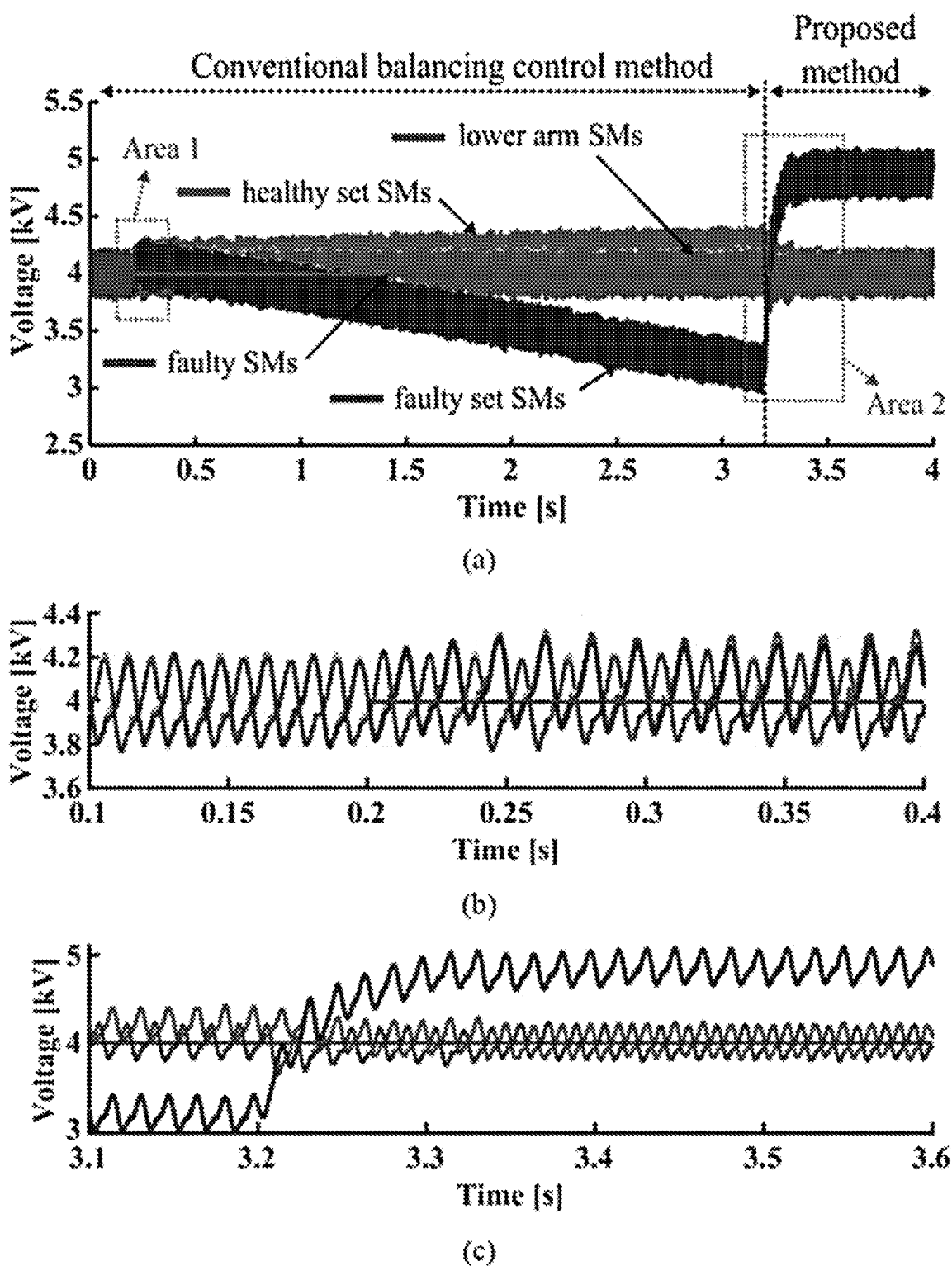
FIG. 25 illustrates an example of SM capacitor voltages with/without the voltage balancing control under SM failures, in accordance with various embodiments of the present disclosure.

Operation with/without the Proposed Voltage Balancing Method under SM Failures. To evaluate the MMC system performance with the conventional voltage balancing method and proposed voltage balancing method, four SMs from set 1 in the upper arm of phase a were intentionally failed and bypassed at $t=0.2$ s. The MMC system operated with unequal numbers of SMs per set after $t=0.2$ s. Plot (a) of FIG. 25 illustrates the SM capacitor voltages with/without proposed voltage balancing control under SM failures. Plots (b) and (c) provide expanded views of areas 1 and 2 in plot (a). The SM voltages of set 1 were discharging with time while the SMs in healthy sets of the upper arm was increased as a result of the decrease in the SM voltages of set 1, as shown in plots (a) and (b) of FIG. 25. When the proposed voltage balancing control method was enabled at t=3.2 s, the SM capacitor voltages in healthy sets of the upper arm converged back to 4 kV while the SM capacitor voltages of set 1 were maintained around 5 kV within ±6% as shown in plot (c) of FIG. 25. The capacitor voltage of the lower arm, which has no SM failures, was maintained at 4 kV. The RTDS results show the capabilities of the proposed voltage balancing method when the MMC operates with unequal numbers of SMs among sets.

Figure 26:
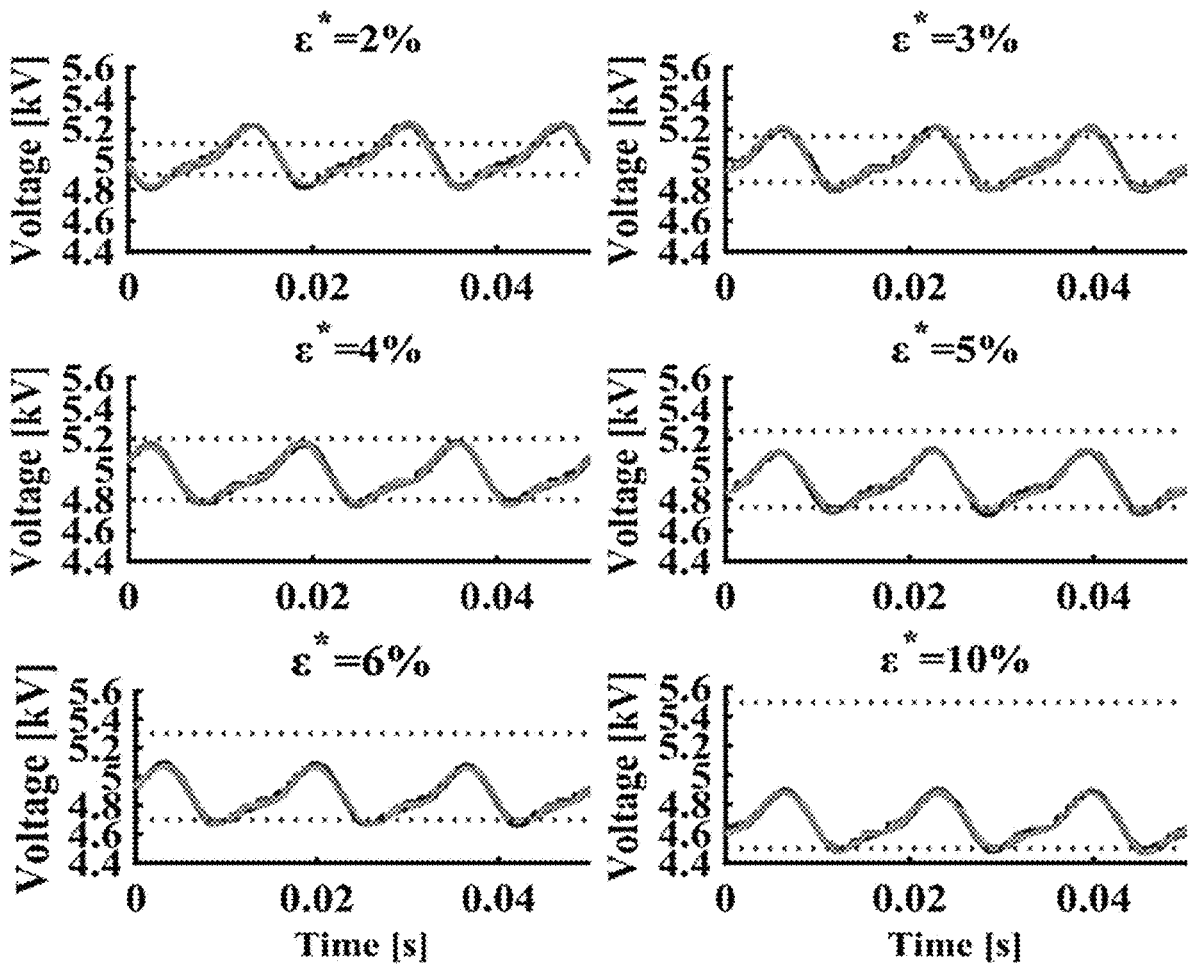
FIG. 26 illustrates an example of SM capacitor voltages of faulted sets with different voltage ripple references, in accordance with various embodiments of the present disclosure.

Performance Evaluation of Proposed Control Method with Different Voltage Ripple Reference Selections. In this case, four SMs from four sets in the upper arm of phase a are failed and bypassed to verify the effectiveness of the proposed voltage balancing method with different voltage ripple reference ($\varepsilon^*$=2,3,4,5,6,10%). The SM capacitor voltages were maintained at 4 kV with voltage ripple $\varepsilon^i$±5% under normal operating conditions. However, the SM capacitor voltages of each faulty set were increased to 5 kV, and the voltage ripple $\varepsilon^i$ was decreased to ±4%. FIG. 26 illustrates an example of the SM capacitor voltages of faulted sets with the different voltage ripple references $\varepsilon^*$. The average SM capacitor voltages were maintained at 5 kV when the voltage ripple reference $\varepsilon^*$ is less than or equal to 4%. The SM capacitor voltages were well-controlled within the selected boundaries. There is a slight deviation in the average SM voltage when the voltage ripple reference $\varepsilon^*$ is larger than 4%.

Figure 27A:
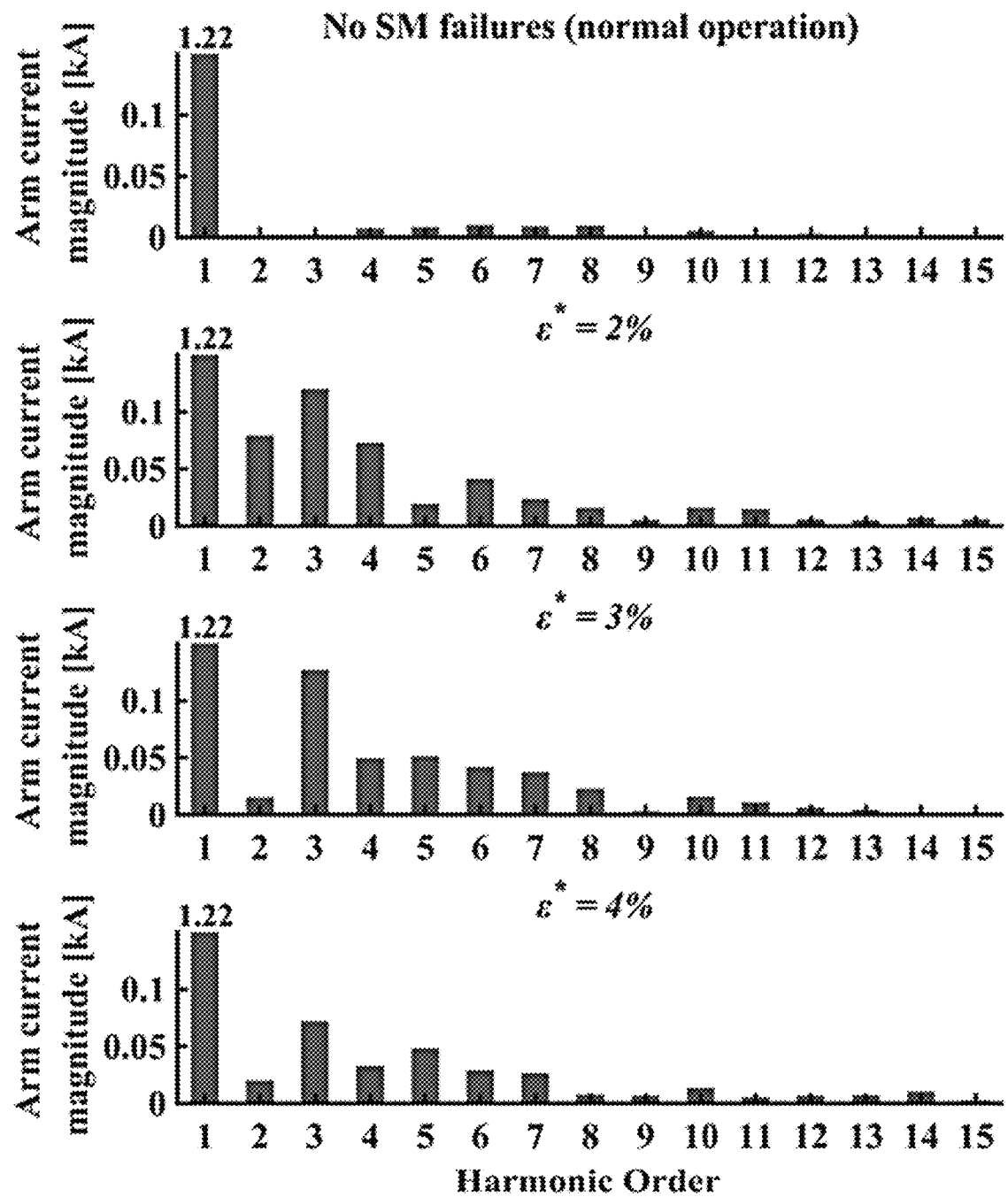
FIGS. 27A and 27B illustrate examples of harmonic and THD analysis of upper arm current in a phase of an MMC with different voltage ripple references, in accordance with various embodiments of the present disclosure.
Figure 27A:
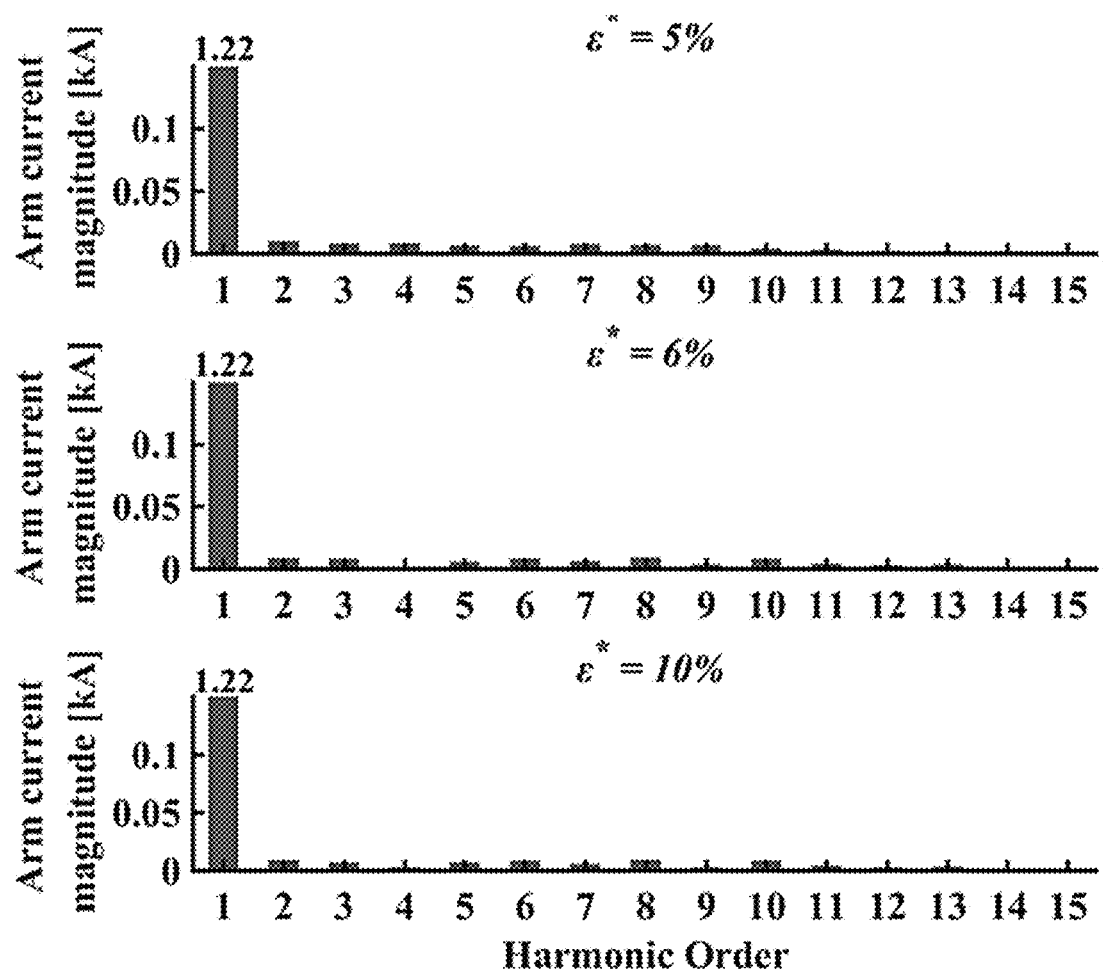
Figure 27B:
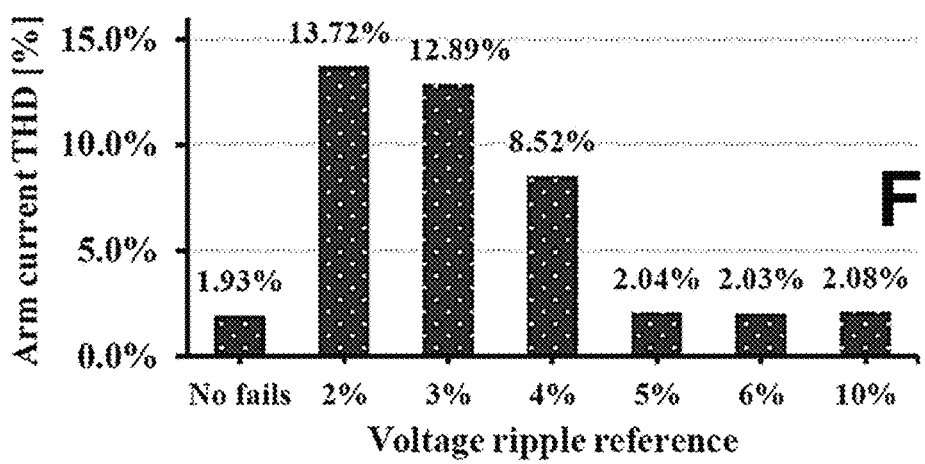

Although the average SM voltages are well-controlled at 5 kV with the voltage ripple references $\varepsilon^*\leq4\%$, the arm current THD is increased because of the additional inserted/bypassed number of SMs $\Delta N_{u,x}^{on,i}$. When the SM capacitor voltages exceed the upper or lower limits, unnecessary additional SMs are inserted or bypassed. These additional SMs increase the arm current harmonic distortions. The harmonic analysis and THD calculations of the upper arm current in phase a with different voltage ripple references are illustrated in FIGS. 27A and 27B, respectively. When the voltage ripple reference $\varepsilon^*$ is larger than 5%, the arm current harmonic distortions are relatively low, which are comparable with the arm current under normal conditions (with typical balancing controls and no SM failures).

This disclosure has presented a new MMC scale-up control design concept and CVB (expand CVB) control to improve the MMC modularity and expandability. Both steady-state and dynamic performance of an MMC with a large number of SMs can be predicted by a cumulative set of a smaller number of SMs. The system level control is assigned to a central control, while the CVB control-based sorting algorithm and the gate signal generations are allocated to local controllers. The proposed control design can be implemented in an RTDS and MMC support unit-based FPGA boards. The proposed control design was evaluated in steady state as well as SLG fault condition for a PTP MMC-HVdc configuration.

The MMC scale-up control design strategy has many advantages:
The number of SMs and local controller units can be easily extended to satisfy different voltage levels.
Modifying the MMC main controller design is not required as the number of SMs changes.
Computational loads can be significantly reduced for a large number of SMs.
The control design is valid for different modulation methods such as phase-shifted and level-shifted PWM techniques.

In addition, a novel submodule fault-tolerant method for MMCs with the scale-up control design considering redundant SMs has been presented. A three-phase MMC system with 160 SMs per arm was studied. The SMs were evenly distributed into local controllers for voltage balancing and SM level protection. The computational burden of local controllers was reduced compared to the conventional centralized control methods. Under abnormal circumstances (e.g., under SM failures), the MMC sets operate with unequal numbers of SMs among sets, which results in unbalanced SM voltages among sets. Thus, a CVB control was proposed to ride-through SM failures and maintain voltages among sets within specified voltage boundaries. Each set of SMs, which can be independently controlled by a local controller, can have different numbers of SMs. The methodology does not require communication between the sets, which significantly improves the expandability in the MMC. The control design and CVB method were verified on the RTDS system and FPGA boards.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A modular multilevel converter (MMC), comprising:
first and second legs each comprising a plurality of submodule (SM) groups connected in series, where each SM group comprises a plurality of SMs;
local group controllers configured to control a corresponding SM group of the plurality of SM groups, where individual local group controllers are configured to provide capacitor voltage balancing (CVB) control of the corresponding SM group, wherein the CVB control by the local group controllers adjusts a number of SMs of the corresponding SM group that are connected in series, wherein the number of SMs is based upon a total harmonic distortion (THD) limit; and a central controller communicatively coupled to the local group controllers, the central controller configured to control output voltage of the MMC via the local group controllers.

2. The MMC of claim 1, wherein the central controller specifies a number of SM groups used to achieve a specified voltage level.

3. The MMC of claim 2, wherein the number of SM groups is determined based at least in part upon DC bus voltage and SM capacitor voltages.

4. The MMC of claim 3, wherein the local group controllers identify the SM capacitor voltages of the corresponding SM groups.

5. The MMC of claim 1, wherein the first and second legs each comprise a series-connected inductor.

6. The MMC of claim 1, wherein the MMC is configured to implement nearest level modulation (NLM) or pulse width modulation (PWM).

7. The MMC of claim 1, wherein the central controller is configured to implement circulating current suppression control for the MMC.

8. The MMC of claim 1, wherein the local group controllers are configured to generate gate signals for the corresponding SM group.

9. The MMC of claim 8, wherein the gate signals are provided based upon a comparison of a difference voltage between a maximum capacitor voltage and a minimum capacitor voltage of the SM group to a defined value.

10. The MMC of claim 9, wherein the gate signals are provided if the difference voltage is greater than the defined value.

11. The MMC of claim 9, wherein the gate signals are provided if a number of specified SMs is adjusted.

* * * * *